United States Patent
Seo et al.

(10) Patent No.: US 10,349,365 B2
(45) Date of Patent: Jul. 9, 2019

(54) METHOD FOR TRANSMITTING SYNCHRONIZATION SIGNAL FOR DIRECT COMMUNICATION BETWEEN TERMINALS IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Inkwon Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 15/306,747

(22) PCT Filed: May 11, 2015

(86) PCT No.: PCT/KR2015/004682
§ 371 (c)(1),
(2) Date: Oct. 25, 2016

(87) PCT Pub. No.: WO2015/170941
PCT Pub. Date: Nov. 12, 2015

(65) Prior Publication Data
US 2017/0055234 A1 Feb. 23, 2017

Related U.S. Application Data

(60) Provisional application No. 61/991,409, filed on May 9, 2014, provisional application No. 61/994,983, filed
(Continued)

(51) Int. Cl.
*H04W 56/00* (2009.01)
*H04J 11/00* (2006.01)
(Continued)

(52) U.S. Cl.
CPC .......... *H04W 56/001* (2013.01); *H04J 11/00* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS

2015/0117295 A1\* 4/2015 Yeh ................... H04W 56/001
370/312
2015/0124579 A1\* 5/2015 Sartori ................... H04J 11/00
370/210

(Continued)

FOREIGN PATENT DOCUMENTS

CN 103548398 1/2014
EP 15789883.4 11/2015
(Continued)

OTHER PUBLICATIONS

Russian Federation Federal Service for Intellectual Property, Patents and Trademarks Application Serial No. 2016148185/07, Office Action dated Jul. 5, 2017, 10 pages.
(Continued)

*Primary Examiner* — Hassan A Phillips
*Assistant Examiner* — Gautam Sharma
(74) *Attorney, Agent, or Firm* — Lee, Hong, Degerman, Kang & Waimey PC

(57) ABSTRACT

The present invention relates to a wireless communication system. Disclosed is a method for transmitting a synchronization signal for direction communication between terminals. A method for transmitting a synchronization signal according to one embodiment of the present invention comprises the steps of: mapping a synchronization signal for
(Continued)

direction communication between terminals to a sub-frame comprising a first slot and a second slot; and transmitting, to a counterpart terminal, the sub-frame to which the synchronization signal is mapped, wherein the synchronization signal is mapped to four orthogonal frequency division multiple access (OFDM) symbols of the sub-frame, and at least two OFDM symbols of the four OFDM symbols may be adjacent to each other.

12 Claims, 35 Drawing Sheets

Related U.S. Application Data on May 18, 2014, provisional application No. 62/003,511, filed on May 27, 2014, provisional application No. 62/036,606, filed on Aug. 12, 2014, provisional application No. 62/052,488, filed on Sep. 19, 2014.

(51) Int. Cl.
  *H04W 72/04* (2009.01)
  *H04L 5/00* (2006.01)
  *H04L 27/26* (2006.01)
  *H04W 92/18* (2009.01)

(52) U.S. Cl.
  CPC ......... *H04L 27/2675* (2013.01); *H04W 56/00* (2013.01); *H04W 72/0446* (2013.01); *H04W 92/18* (2013.01)

(56) References Cited

U.S. PATENT DOCUMENTS

| 2015/0207603 A1* | 7/2015 | Yie | H04L 5/0048 370/280 |
|---|---|---|---|
| 2015/0208371 A1* | 7/2015 | Yie | H04J 11/003 370/329 |
| 2015/0264588 A1* | 9/2015 | Li | H04W 56/0015 370/350 |

FOREIGN PATENT DOCUMENTS

| RU | 2510583 | 3/2014 |
|---|---|---|
| WO | 2010109303 | 9/2010 |
| WO | 2013069994 | 5/2013 |
| WO | 2013155198 | 10/2013 |
| WO | 2015030548 | 3/2015 |
| WO | 2015109528 | 7/2015 |

OTHER PUBLICATIONS

ZTE, "Synchronization Design for D2D Broadcast Communication", 3GPP TSG RAN WG1 Meeting #76, R1-140269, Feb. 2014, 11 pages.
PCT International Application No. PCT/KR2015/004682, Written Opinion of the International Searching Authority dated Aug. 20, 2015, 19 pages.
Qualcomm Incorporated, "Signal Design for D2D Synchronization", R1-140462, 3GPP TSG-RAN WG1 #76, Feb. 1, 2014, 9 pages.
ZTE "Synchronization Design for D2D Broadcast Communication", R1-140269, 3GPP TSG-RAN WG1 #76, Jan. 31, 2014, 13 pages.
Qualcomm Incorporated, "Signal Design and Resource Allocation for D2D Synchronization", R1-135317, 3GPP TSG-RAN WG1 #75, Nov. 2, 2013, 8 pages.
LG Electronics, "On the Design of D2DSS and PD2DSCH", R1-140329, 3GPP TSG-RAN WG1 #76, Feb. 1, 2014, 8 pages.
LG Electronics, "Discussion on design of D2DSS and PD2DSCH", R1-141357, 3GPP TSG RAN WG1 Meeting #76bis, Mar. 22, 2014, 6 pages.
European Patent Office Application Serial No. 15789883A, Search Report dated Dec. 21, 2017, 9 pages.
Catt, "Resource allocation for D2DSS and PD2DSCH", 3GPP TSG RAN WG1 Meeting #76bis, R1-141196, Apr. 2014, 4 pages.
The State Intellectual Property Office of the People's Republic of China Application Serial No. 201580024292.5, Office Action dated Feb. 26, 2018, 18 pages.
The State Intellectual Property Office of the People's Republic of China Application No. 2015800242925, Office Action dated Nov. 23, 2018, 9 pages.
European Patent Office Application Serial No. 15789883.4, Search Report dated Sep. 3, 2018, 7 pages.
LG Electronics, "Discussion on design of D2DSS and PD2DSCH", 3GPP TSG RAN WG1 Meeting #75, R1-135479, Nov. 2013, 6 pages.
Intel Corporation, "Discussion on D2DSS Physical Structure", R1-141166, 3GPP TSG RAN WG1 Meeting #76bis, Apr. 2014, 6 pages.

* cited by examiner

FIG. 2
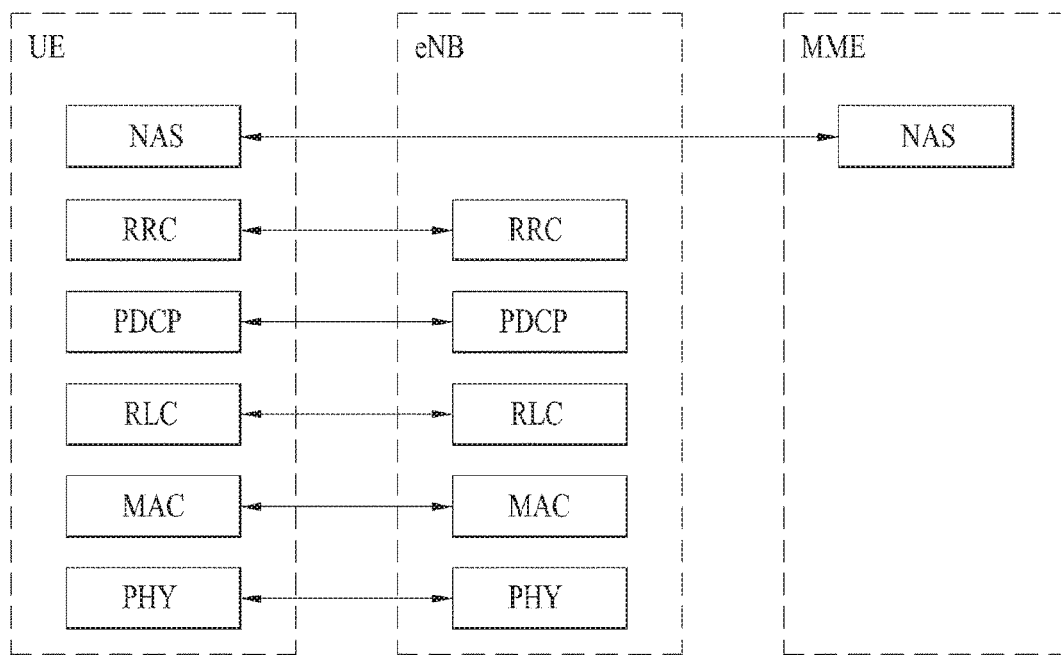
(a) Control-plane protocol stack
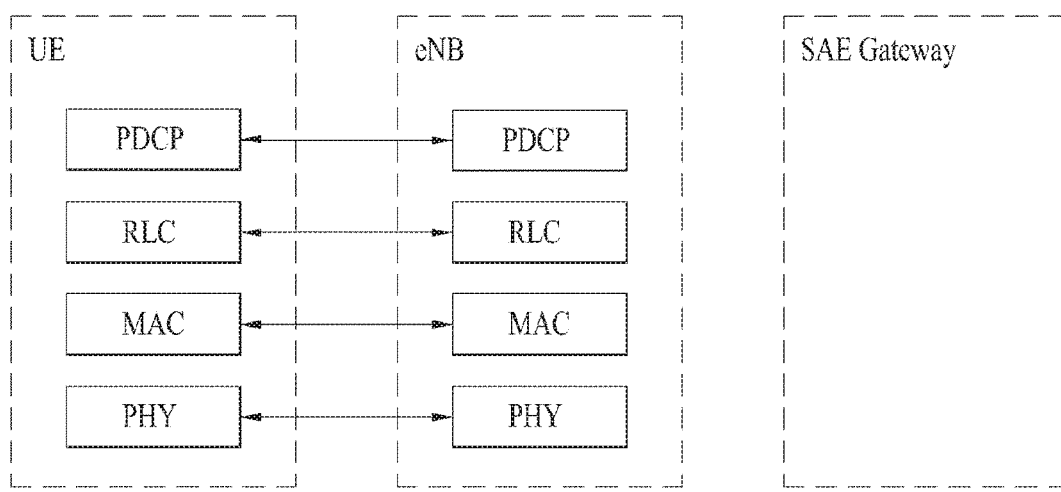
(b) User-plane protocol stack FIG. 16
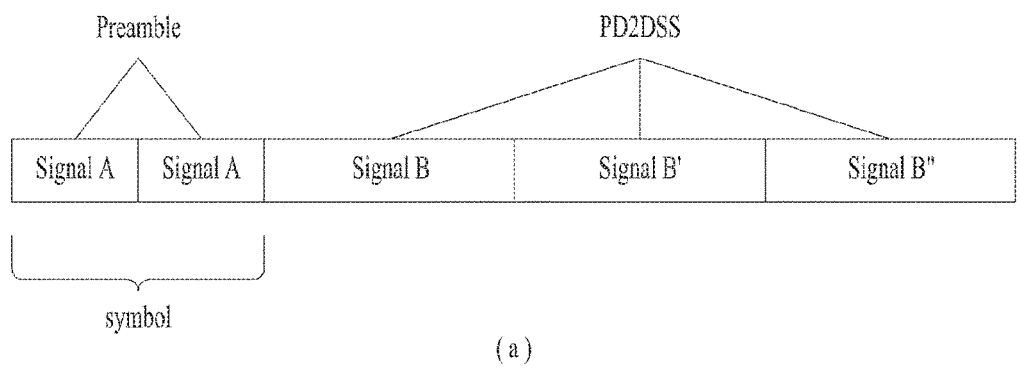
(a)
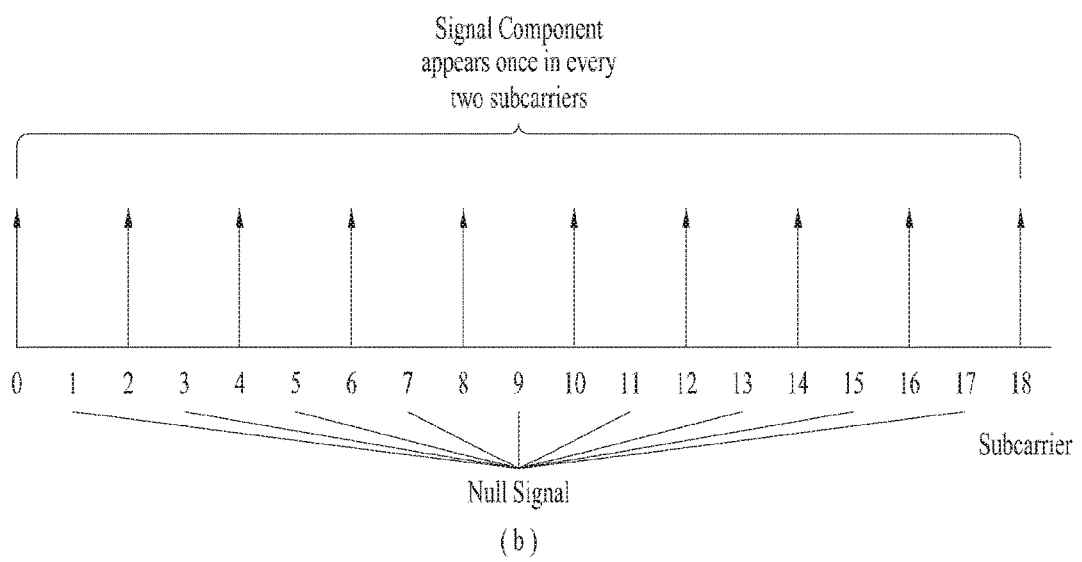
(b)

FIG. 17
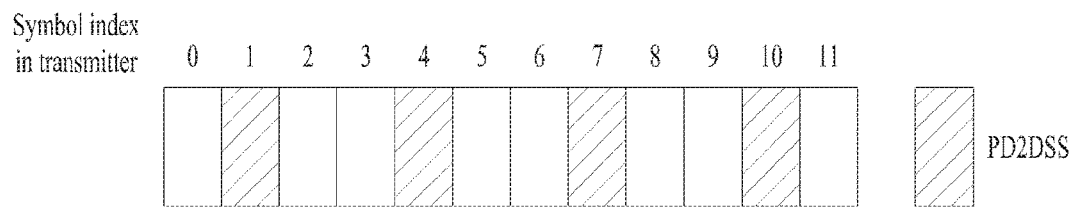
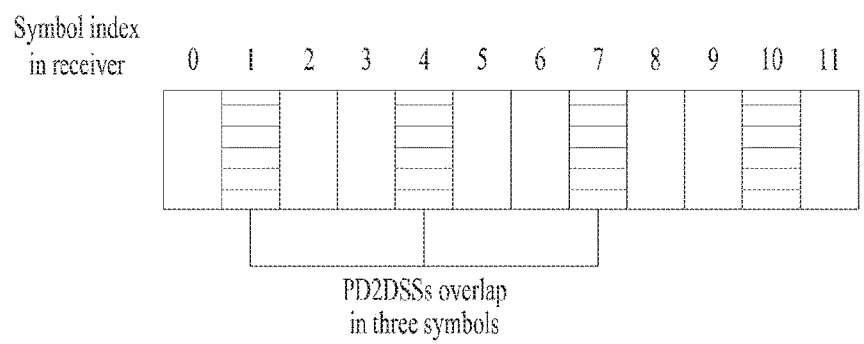
(a)
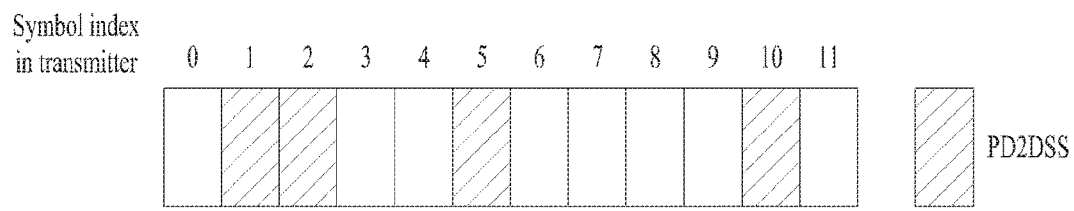
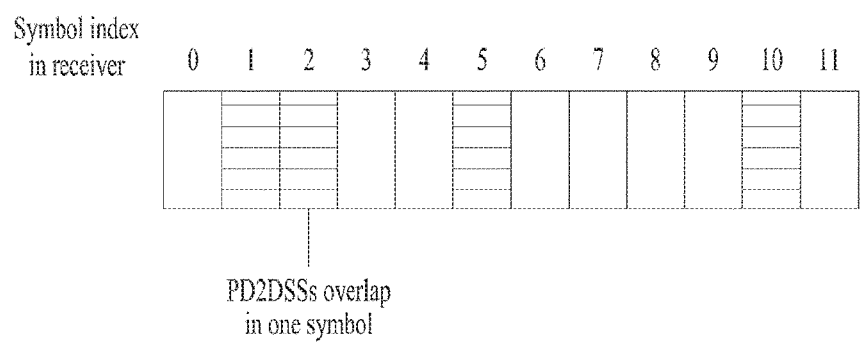
(b)

FIG. 26
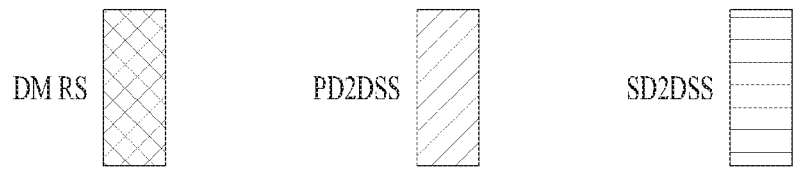
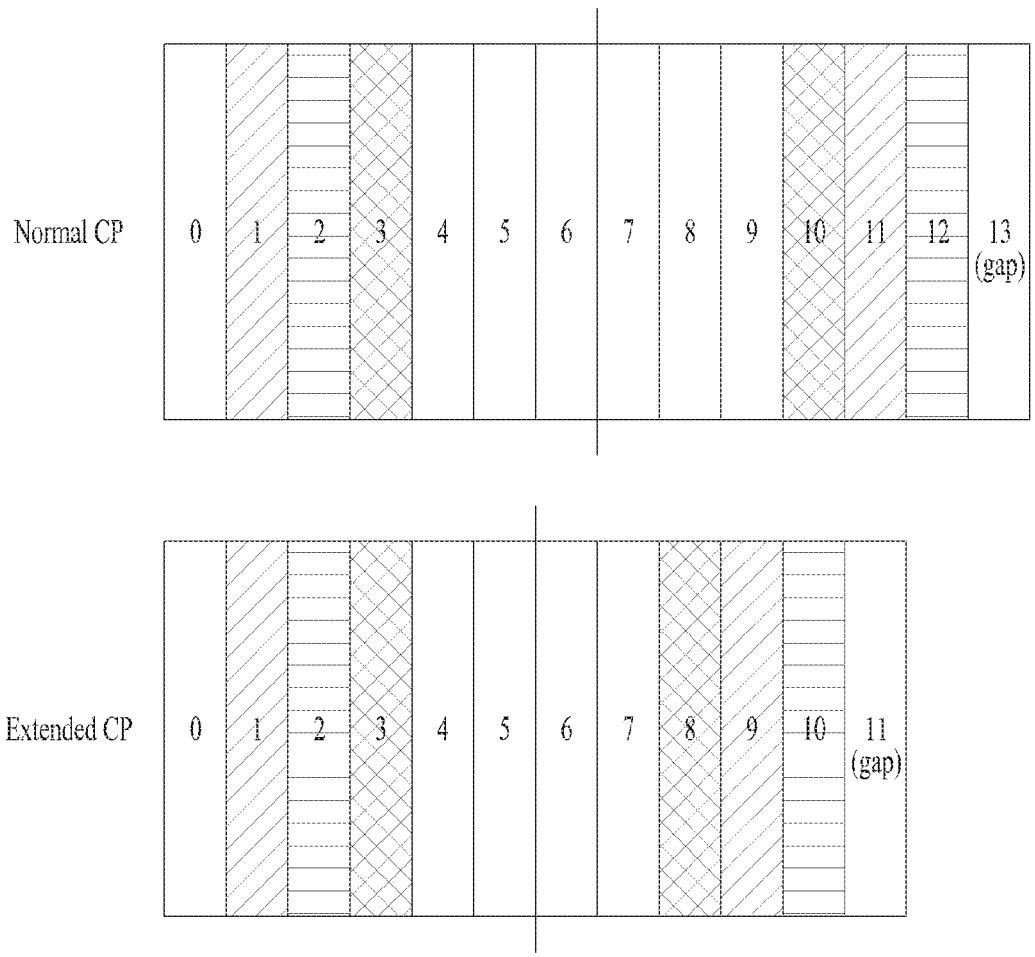

FIG. 32
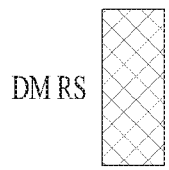 DM RS 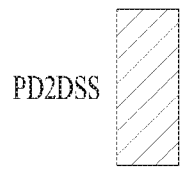 PD2DSS  SD2DSS
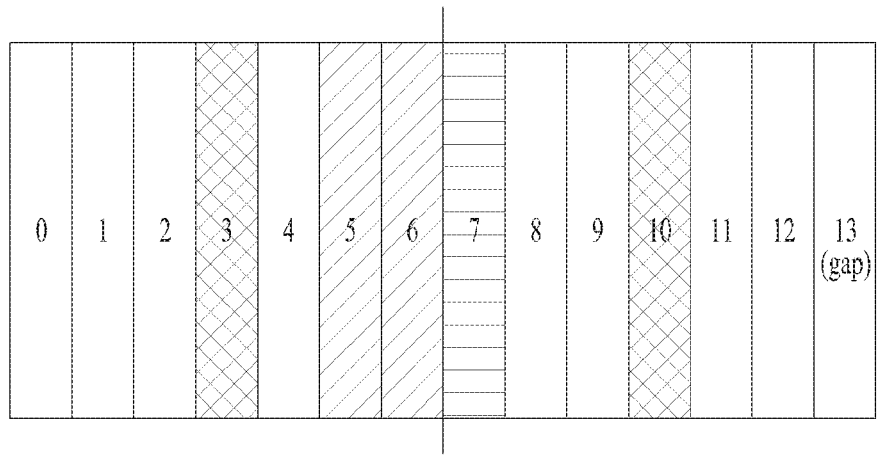
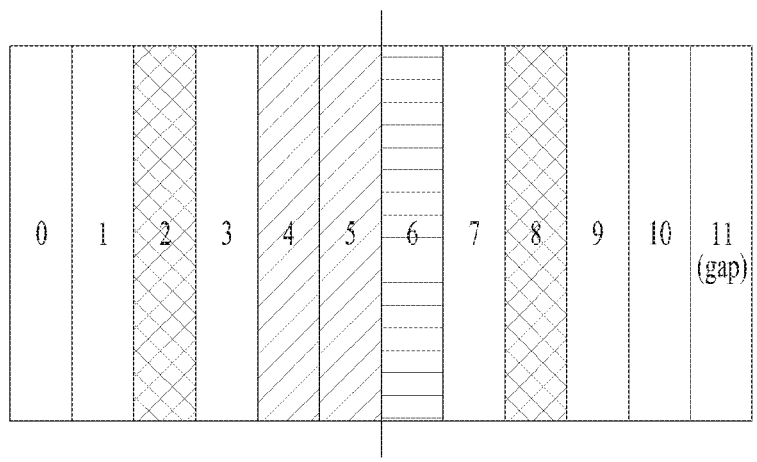

FIG. 33
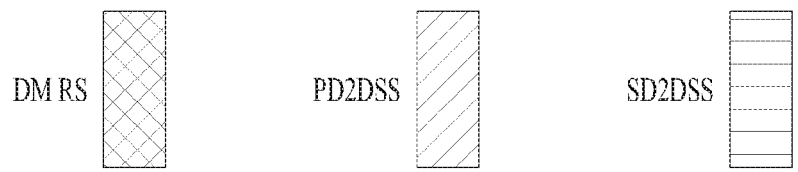
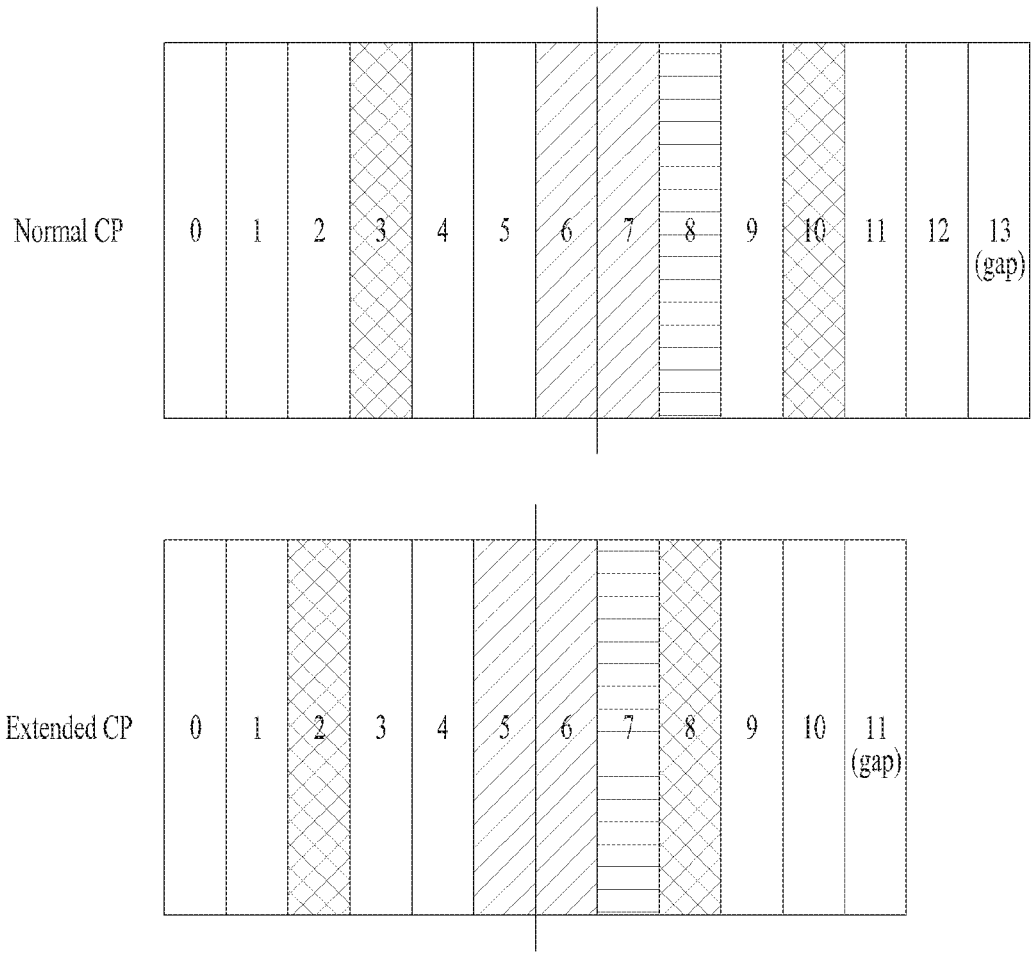

METHOD FOR TRANSMITTING SYNCHRONIZATION SIGNAL FOR DIRECT COMMUNICATION BETWEEN TERMINALS IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2015/004682, filed on May 11, 2015, which claims the benefit of U.S. Provisional Application No. 61/991,409, filed on May 9, 2014, 61/994,983, filed on May 18, 2014, 62/003,511, filed on May 27, 2014, 62/036,606, filed on Aug. 12, 2014, and 62/052,488, filed on Sep. 19, 2014, the contents of which are all hereby incorporated by reference herein in their entirety.

TECHNICAL FIELD

The present invention relates to a wireless communication system, and more particularly, to a method for transmitting a synchronization signal for direct communication between terminals in a wireless communication system and apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

The technical task of the present invention is to provide a method for transmitting or receiving a synchronization signal for direct communication between terminals in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of transmitting a synchronization signal for direct communication between user equipments, which is transmitted by a user equipment in a wireless communication system, including: mapping the synchronization signal for the direct communication between the user equipments to a subframe including a first slot and a second slot; and transmitting, to a target user equipment, the subframe to which the synchronization signal is mapped, wherein the synchronization signal is mapped to four OFDM (orthogonal frequency division multiple access) symbols of the subframe, and wherein at least two OFDM symbols among the four OFDM symbols are adjacent to each other.

In a second technical aspect of the present invention, provided herein is a user equipment for performing a method of transmitting a synchronization signal for direct communication between user equipments in a wireless communication system, including: a processor for mapping the synchronization signal for the direct communication between the user equipments to a subframe including a first slot and a second slot; and a transceiver module for transmitting, to a target user equipment, the subframe to which the synchronization signal is mapped, wherein the synchronization signal is mapped to four OFDM (orthogonal frequency division multiple access) symbols of the subframe, and wherein at least two OFDM symbols among the four OFDM symbols are adjacent to each other.

The following items may be commonly applied to the first and second technical aspects of the present invention.

Preferably, the synchronization signal may include a primary synchronization signal and a secondary synchronization signal. In this case, the primary synchronization signal and the secondary synchronization signal may be respectively mapped to two OFDM symbols of the subframe.

The primary synchronization signal may be mapped to two OFDM symbols included in the first slot and the secondary synchronization signal may be mapped to two OFDM symbols included in the second slot.

The primary synchronization signal may be mapped to OFDM symbols preceding a symbol, to which a reference signal is mapped, of the second slot. In addition, the secondary synchronization signal may be mapped to OFDM symbols following a symbol, to which a reference signal is mapped, of the second slot.

When the subframe has a normal CP (cyclic prefix) configuration, the primary synchronization signal may be mapped to second and third OFDM symbols of the first slot and the secondary synchronization signal may be mapped to fifth and sixth OFDM symbols of the second slot.

When the subframe has an extended CP (cyclic prefix) configuration, the primary synchronization signal may be mapped to first and second OFDM symbols of the first slot and the secondary synchronization signal may be mapped to fourth and fifth OFDM symbols of the second slot.

A last symbol of the subframe may be configured as a gap.

Further, the reference signal may correspond to a DM-RS (demodulation reference signal).

The above-described aspects of the present invention are merely a part of preferred embodiments of the present invention. Those skilled in the art will derive and understand various embodiments reflecting the technical features of the present invention from the following detailed description of the present invention.

Advantageous Effects

According to the present invention, transmission and reception of a D2D (device-to-device) signal can be efficiently performed in a wireless communication system. Specifically, a synchronization signal for direct communication between terminals can be efficiently transmitted or received in the system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a user equipment and E-UTRAN based on a 3GPP radio access network standard.

FIG. 16 is a diagram for explaining an example of a synchronization signal structure applicable to the present invention.

FIG. 17 illustrates a method of arranging PD2DSSs when a plurality of OFDM symbols are used for the PD2DSSs within one subframe as one embodiment of the present invention.

FIGS. 20 to 30 illustrate embodiments in which D2DSSs are arranged on four OFDM symbols within one subframe in consideration of a reference signal.

FIGS. 31 to 33 illustrate embodiments in which D2DSSs are arranged on three OFDM symbols within one subframe in consideration of a reference signal.

BEST MODE FOR INVENTION

Figure 1:
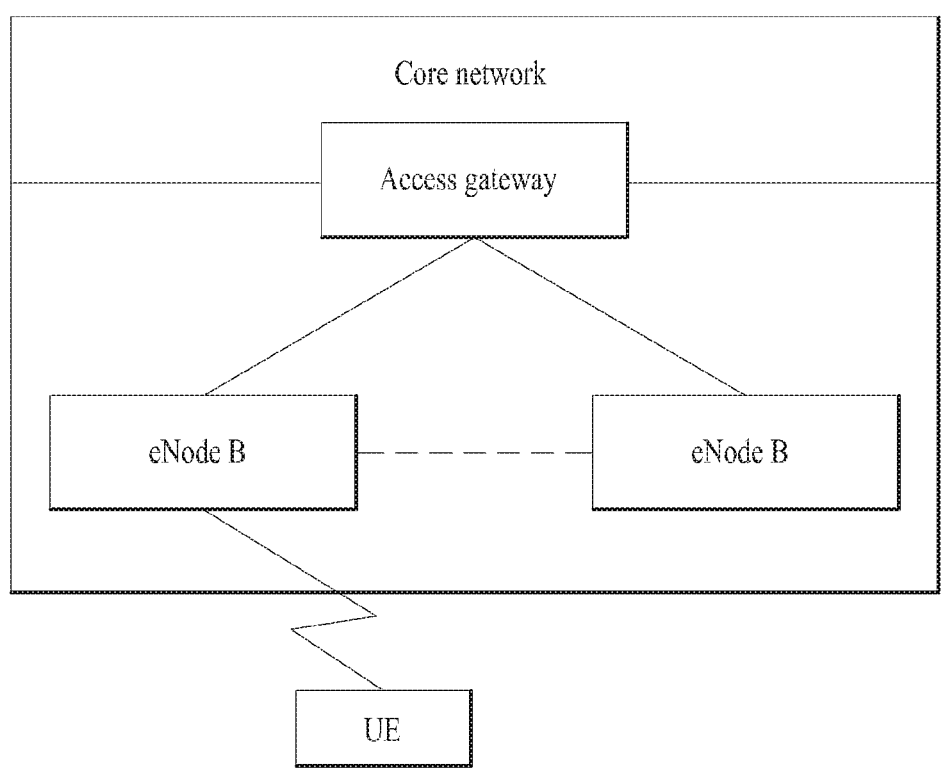
FIG. 1 illustrates an E-UMTS network structure as one example of a wireless communication system.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
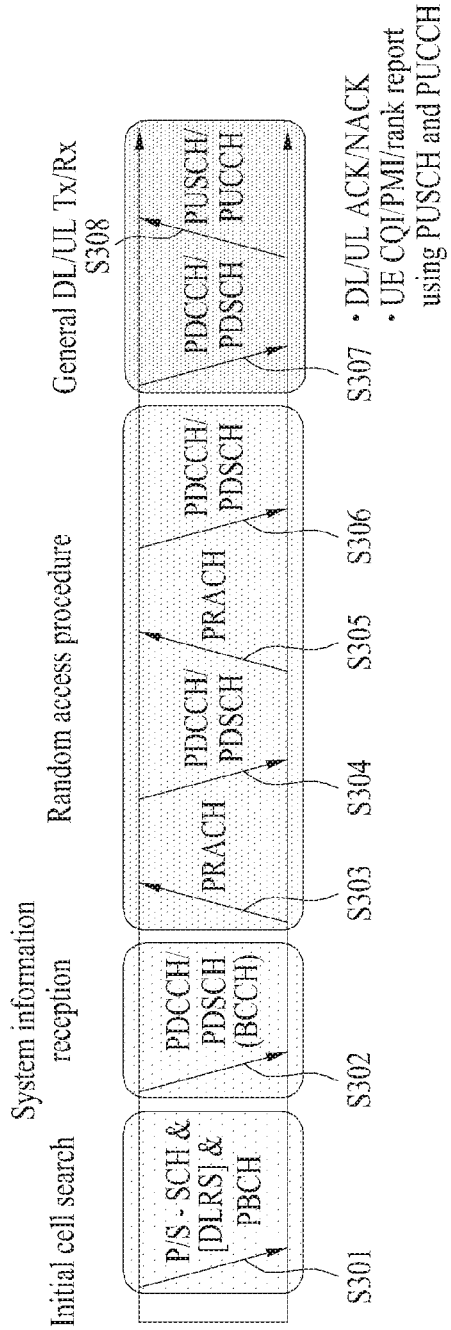
FIG. 3 illustrates physical channels used in a 3GPP LTE system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMFRI and the like on PUSCH and/or PUCCH.

Figure 4:
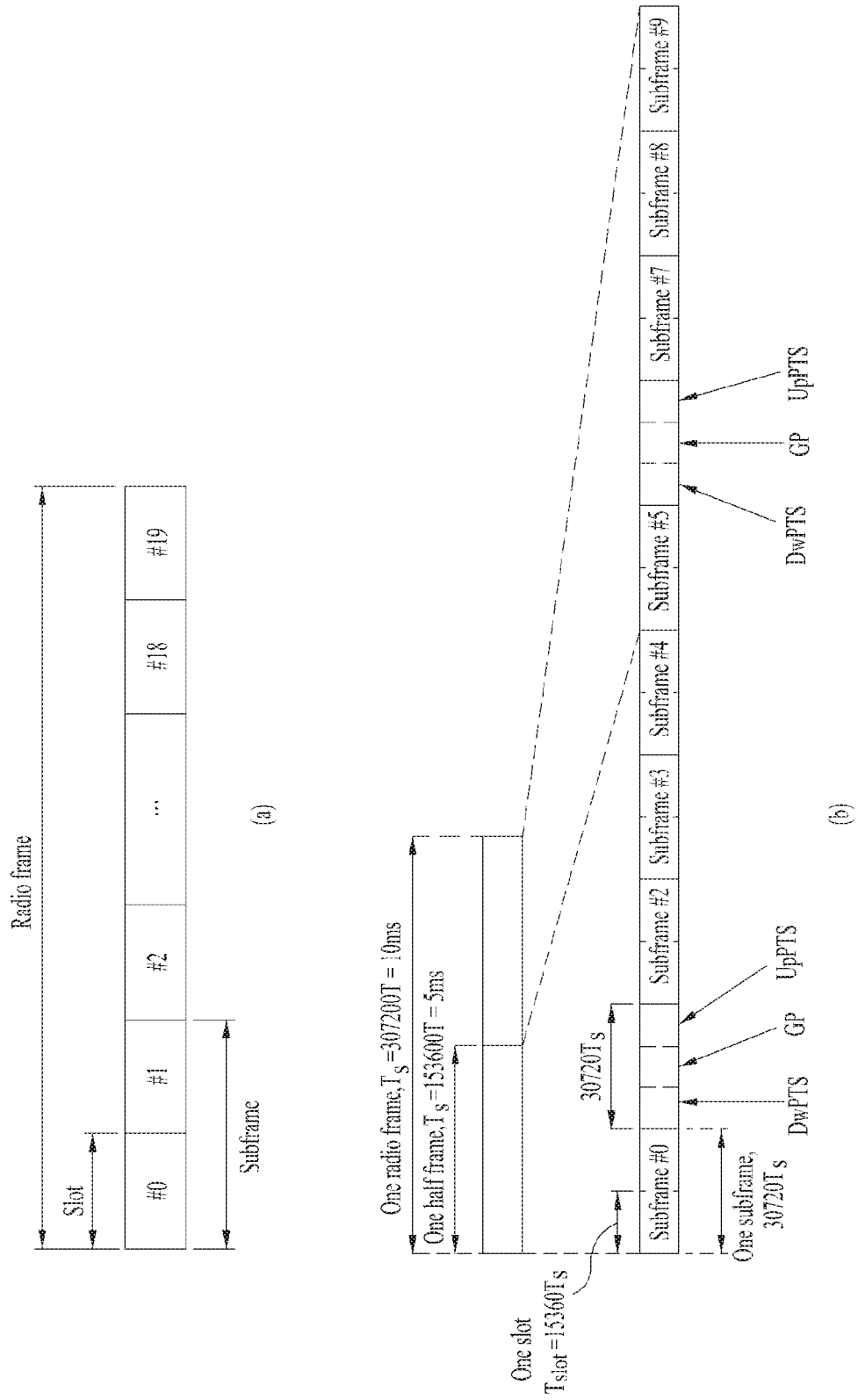
FIG. 4 illustrates a structure of a radio frame used in an LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

The structure of the above radio frame is just example. The number of a subframe, the number of slot included in a subframe or the number of symbol included in a slot included in the radio frame can be changed.

Figure 5:
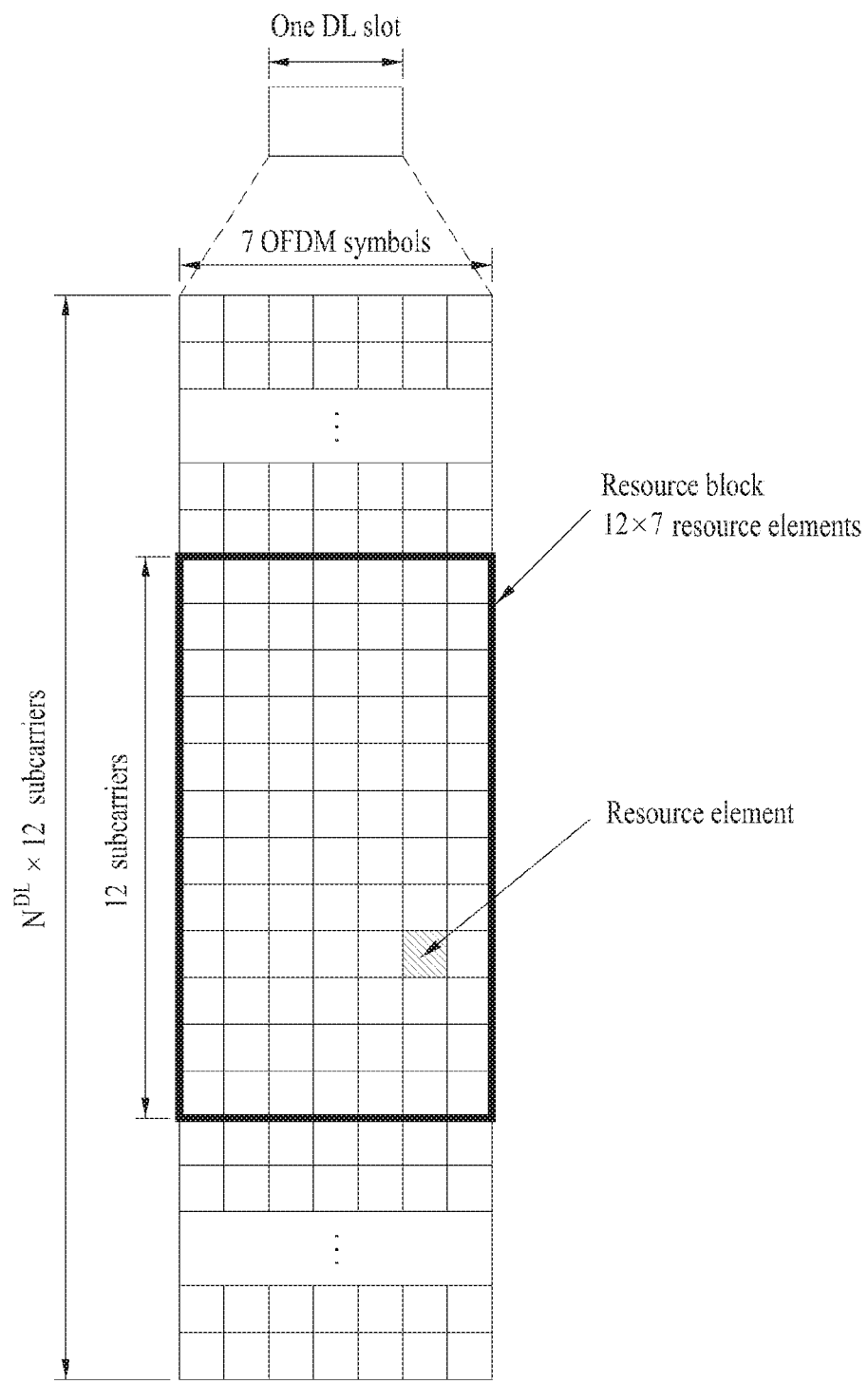
FIG. 5 illustrates a resource grid for a downlink slot.

FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

Figure 6:
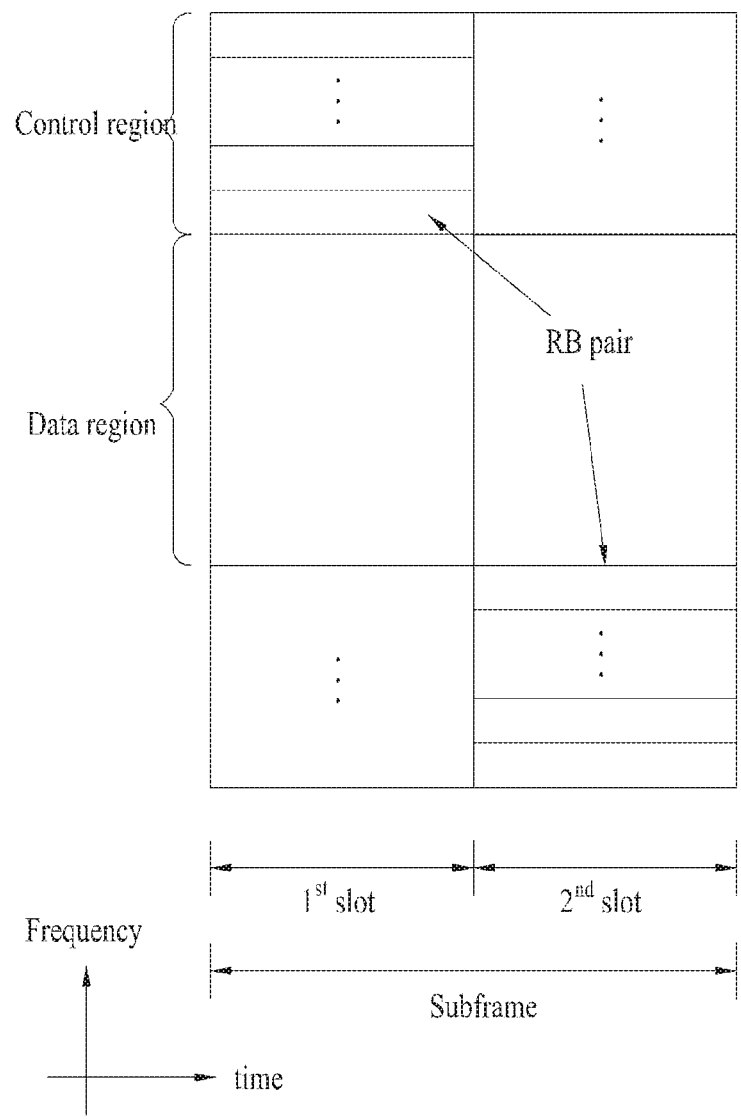
FIG. 6 illustrates a structure of an uplink subframe.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
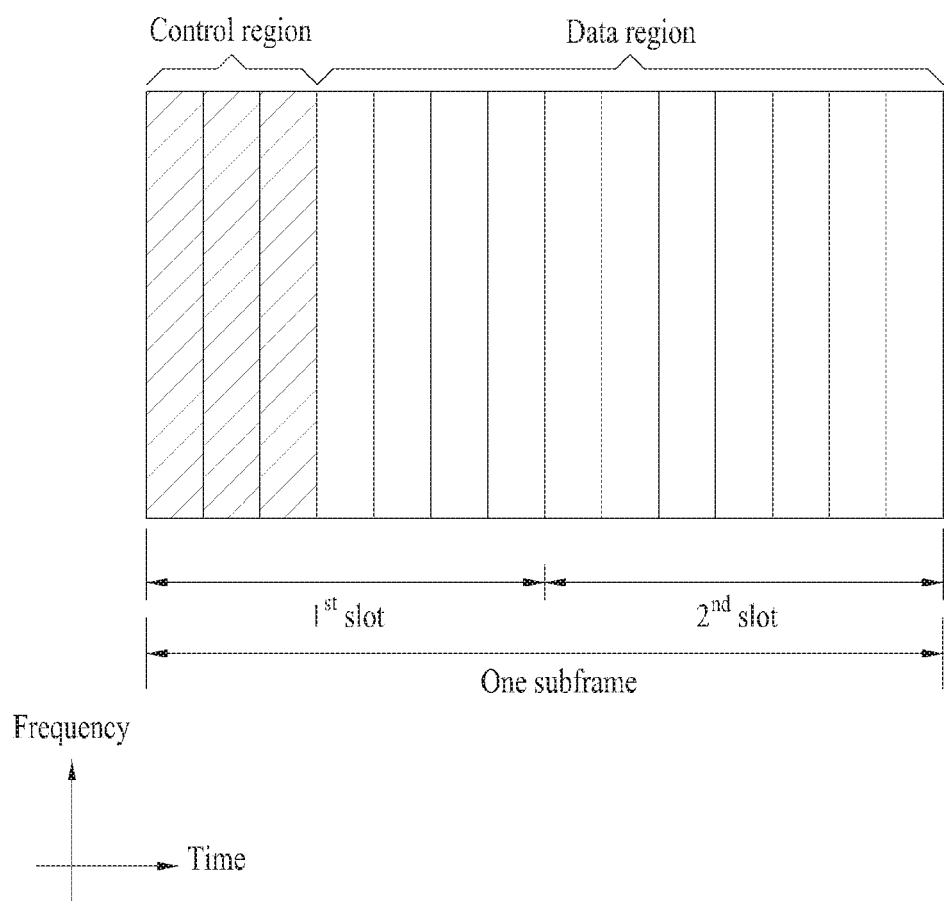
FIG. 7 illustrates a structure of a downlink subframe used in an LTE system.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The PCFICH is transmitted in a first OFDM symbol of a subframe and carries information on the number of OFDM symbols used for transmission of control channels (i.e. the size of the control region) in the subframe. The PHICH is a channel in response to UL transmission and carries ACK/NACK (acknowledgement/negative-acknowledgement) signal for HARQ (hybrid automatic repeat request). Control information transmitted through the PDCCH is called downlink control information (DCI). The DCI includes UL resource allocation information, DL resource allocation information, or UL transmit (TX) power control commands for a random UE group.

Carrier Aggregation

Figure 8:
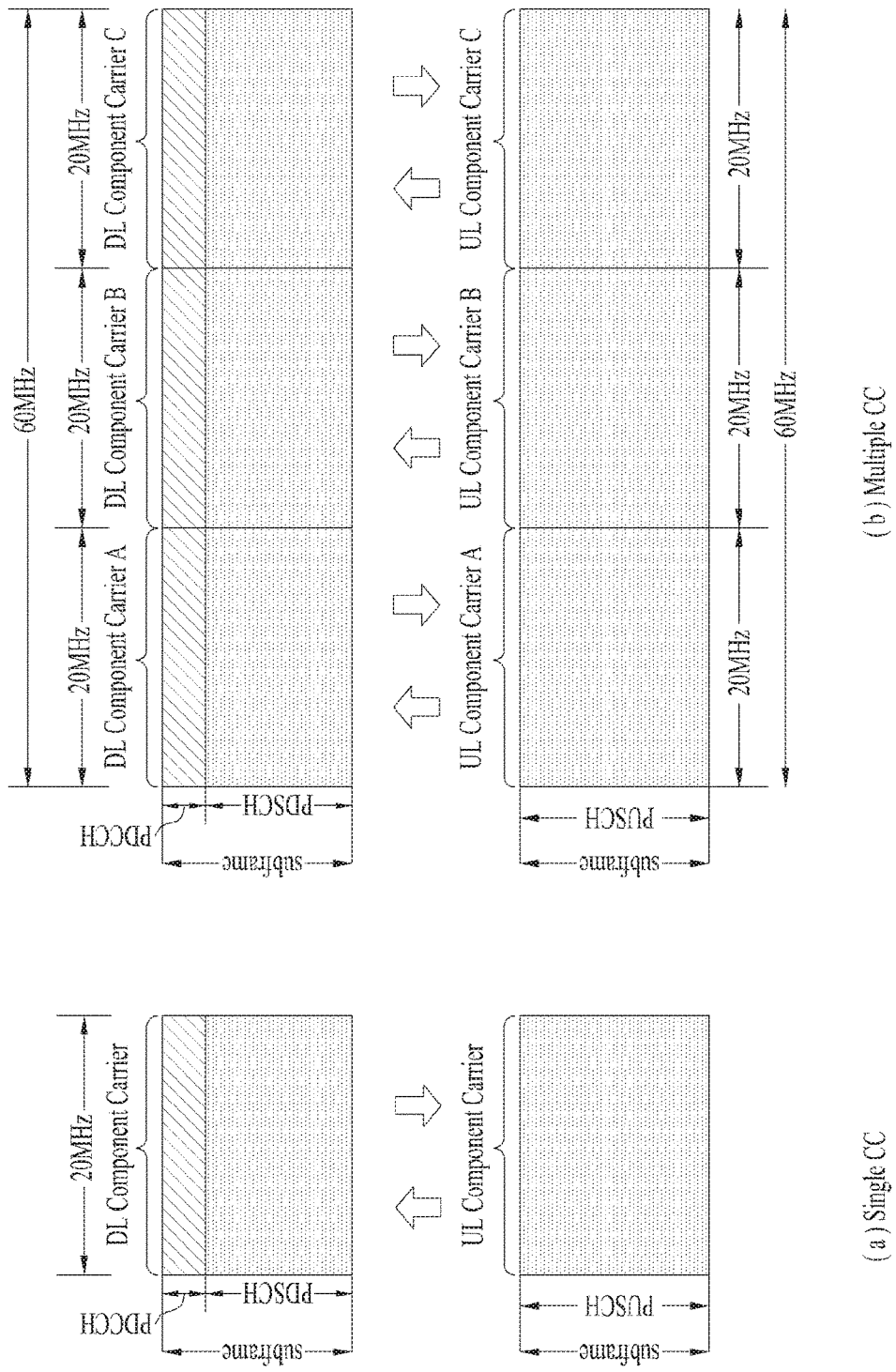
FIG. 8 is a diagram for explaining carrier aggregation.

FIG. 8 is a diagram for explaining carrier aggregation. Before description is given of carrier aggregation, the concept of a cell introduced to manage radio resources in LTE-A will be described first. A cell may be regarded as a combination of downlink resources and uplink resources. The uplink resource is not an essential element of the cell. The uplink resources are not essential elements and thus the cell may be composed of the downlink resources only or both of the downlink resources and uplink resources. However, this is the definition defined in the LTE-A release 10 and the cell may be composed of the uplink resources only. The DL resource may be called a downlink component carrier (DL CC) and the UL resource may be called an uplink component carrier (UL CC). The UL CC and the DL CC can be represented by a carrier frequency. The carrier frequency means a center frequency of a corresponding cell.

Cells may be divided into a primary cell (PCell), which operates at a primary frequency, and a secondary cell (SCell), which operates at a secondary frequency. The PCell and the SCell may be collectively referred to as a serving cell. The PCell may be designated during an initial connection establishment, connection re-establishment or handover procedure of a UE. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection and it may be used for providing additional radio resources. In the carrier aggregation environment, all serving cells except the PCell may be considered as SCells. In case that a UE in an RRC_CONNECTED state fails to establish the carrier aggregation or does not support the carrier aggregation, only a single serving cell consisting of PCells exists. On the other hand, in the case in which a UE is in the RRC_CONNECTED state and the carrier aggregation is established, one or more serving cells exist. Moreover, in this case, PCells and all SCells are included in the serving cells. After starting an initial security activation procedure, a network may configure one or more SCells in addition to the PCell configured at the beginning of the connection establishment procedure for a UE supporting the carrier aggregation.

Hereinafter, the carrier aggregation is described with reference to FIG. 8. The carrier aggregation is a technology introduced to allow the use of a broader band to meet the demands for a high-speed transmission rate. The carrier aggregation may be defined as aggregation of two or more component carriers (CCs) having different carrier frequencies or aggregation of two or more cells. Referring to FIG. 8, FIG. 8 (a) shows a subframe in the legacy LTE system in which one CC is used and FIG. 8 (b) shows a subframe to which the carrier aggregation is applied. Particularly, FIG. 8 (b) illustrates an example in which a bandwidth of total 60 MHz is supported in a manner of using three CCs of 20 MHz. In this case, the three CCs may be contiguous or non-contiguous.

A UE may simultaneously receive and monitor downlink data through a plurality of DL CCs. Linkage between a DL CC and a UL CC may be indicated by system information. The DL CC/UL CC link may be fixed in the system or may be semi-statically configured. Additionally, even if an entire system band is configured with N CCs, a frequency band that can be monitored/received by a specific UE may be limited to M(<N) CCs. Various parameters for the carrier aggregation may be set up cell-specifically, UE group-specifically, or UE-specifically.

Figure 9:
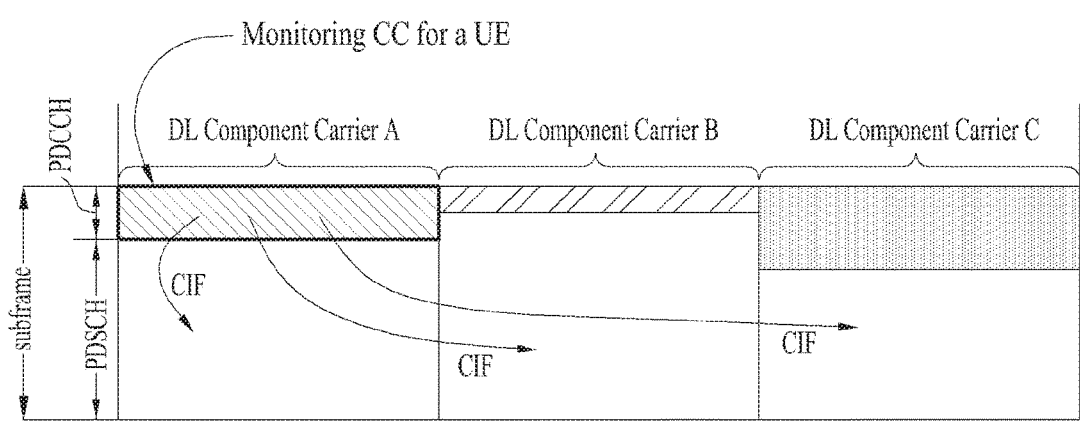
FIG. 9 is a diagram for explaining cross-carrier scheduling.

FIG. 9 is a diagram for explaining cross carrier scheduling. For instance, the cross carrier scheduling means to include all DL scheduling allocation information of a DL CC in a control region of another DL CC selected from a plurality of serving cells. Alternatively, the cross carrier scheduling means to include all UL scheduling grant information on a plurality of UL CCs, which are linked to a DL CC selected among a plurality of serving cells, in a control region of the DL CC.

Hereinafter, a carrier indicator field (CIF) will be described.

As described above, the CIF may be included in a DCI format transmitted through a PDCCH (in this case, a size of the CIF may be defined as, for example, 3 bits) or may not be included in the DCI format (in this case, a size of the CIF may be defined as 0 bit). If the CIF is included in the DCI format, this indicates that the cross-carrier scheduling is applied. In case that the cross-carrier scheduling is not applied, downlink scheduling allocation information is valid for a DL CC through which the downlink scheduling allocation information is currently transmitted. In addition, an uplink scheduling grant is valid for a UL CC linked to the DL CC through which the downlink scheduling allocation information is transmitted.

In case that the cross-carrier scheduling is applied, the CIF indicates a CC related to the downlink scheduling allocation information which is transmitted over the PDCCH in a DL CC. For example, referring to FIG. 9, downlink allocation information on DL CC B and DL CC C, i.e., information on PDSCH resources, is transmitted through a PDCCH in a control region of DL CC A. After monitoring DL CC A, a UE may recognize that a resource region of PDSCH and the corresponding CC.

Whether or not the CIF is included in the PDCCH may be set semi-statically and the CIF may be enabled UE-specifically through higher layer signaling.

When the CIF is disabled, a PDCCH in a specific DL CC allocates a PDSCH resource in the same DL CC and may also allocate a PUSCH resource in a UL CC linked to the specific DL CC. In this case, a coding scheme, CCE-based resource mapping, a DCI format, and the like identical to those in the legacy PDCCH structure may be applied.

On the other hand, when the CIF is enabled, a PDCCH in a specific DL CC may allocate a PDSCH/PUSCH resource in a single DL/UL CC indicated by the CIF, among a plurality of the aggregated CCs. In this case, the CIF may be additionally defined in the legacy PDCCH DCI format. That is, the CIF may be defined as a field with a fixed length of 3 bits. Alternatively, a CIF position may be fixed regardless of a size of the DCI format. The coding scheme, CCE-based resource mapping, DCI format, and the like of the legacy PDCCH structure may also be applied to this case.

When the CIF exists, an eNB may allocate a DL CC set in which the PDCCH is to be monitored. Accordingly, the burden of blind decoding to a UE may be lessened. The PDCCH monitoring CC set corresponds to a portion of all aggregated DL CCs and the UE may perform PDCCH detection/decoding only in the corresponding CC set. In other words, to perform PDSCH/PUSCH scheduling for a UE, the eNB may transmit the PDCCH only in the PDCCH monitoring CC set. The PDCCH monitoring DL CC set may be configured UE-specifically, UE group-specifically or cell-specifically. For example, when 3 DL CCs are aggregated as shown in the example of FIG. 9, DL CC A may be set as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case that the DL CC A is set as the PDCCH monitoring CC, the PDCCH may not be transmitted in DL CC B and DL CC C.

Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a timing advance. Assuming that a UE is randomly located randomly in a cell, the timing advance from the UE to the eNB may vary depending on a location of the UE. For instance, if the UE is located at the boundary of the cell instead of at the center of the cell, the timing advance of the UE may be increased. In addition, the timing advance may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as timing advance maintenance or time alignment.

The timing advance maintenance or time alignment may be performed in a random access procedure. During the random access procedure, an eNB may receive a random access preamble from a UE and then calculate a timing advance value using the received random access preamble. The UE may receive the calculated timing advance value through a random access response and then update a signal transmission timing based on the received timing advance value. Alternatively, after receiving an uplink reference signal (e.g., SRS (sounding reference signal) that is transmitted periodically or aperiodically from the UE, the eNB may calculate the timing advance. Thereafter, the UE may update the signal transmission timing based on the calculated timing advance value.

As described above, the eNB may measure UE's timing advance through the random access preamble or the uplink reference signal and then inform the UE of an adjustment value for the time alignment. Here, the adjustment value for time alignment may be referred to as a timing advance command (TAC). The TAC may be processed by a MAC layer. If a UE receives the TAC from the eNB, the UE assumes that the received TAC is valid only for a prescribed time. A time alignment timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset}) \times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of 16 $T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

TAG (Timing Advance Group)

In case that a UE use a plurality of serving cells, there may be serving cells having similar timing advance characteristics. For example, serving cells having similar frequency characteristics (e.g. frequency bands) or similar propagation delays may have similar timing advance characteristics. Thus, when carrier aggregation is performed, serving cells having similar timing advance characteristics may be managed as a group to optimize signaling overhead caused by synchronization adjustment of a plurality of uplink timings. Such a group may be referred to as a timing advance group (TAG). Serving cell(s) having similar timing advance characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

Hereinafter, a description will be given of a structure of TAC MAC CE for transmitting the TAC to a UE.

TAC MAC CE (Timing Advance Command MAC CE)

In the 3GPP LTE system, MAC (medium access control) PDU (protocol data unit) includes a MAC header, a MAC control element (CE), and at least one MAC service data unit (SDU). The MAC header includes at least one sub-header. Each sub-header corresponds to the MAC CE and MAC SDU. The sub-header is used to represent lengths and properties of the MAC CE and MAC SDU.

The MAC SDU is a data block provided from a higher layer (e.g., an RLC layer or an RRC layer) of a MAC layer. The MAC CE is used to deliver control information of the MAC layer such as a buffer status report.

The MAC sub-header includes the following fields

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 10:
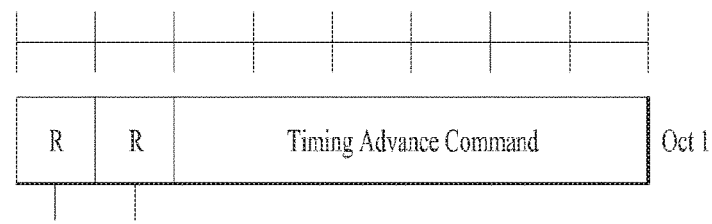
FIG. 10 illustrates a structure of a TAC MAC CE.

FIG. 6 illustrates TAC MAC CE corresponding to a fixed-sized MAC CE. TAC is used for controlling the amount of time adjustment to be applied to a UE and it is identified by the LCID of the MAC PDU sub-header. Here, the MAC CE has a fixed size and it is configured with a single octet as shown in FIG. 10.

R (1 bit): A reserved field.

TAC (timing advance command) (6 bits): It indicates a TA index value (e.g., 0, 1, 2, . . . , 63) used for controlling the amount of time adjustment to be applied to a UE.

Although the adjustment value for the time alignment may be transmitted through the TAC, it may be transmitted through a random access response (hereinafter abbreviated as RAR) in response to a random access preamble transmitted from a UE for initial access. Hereinafter, a description will be given of a method of performing a random access procedure proposed for TAC reception.

Random Access Procedure

In the LTE system, a UE can perform a random access procedure in the following cases:

The UE performs initial access without RRC connection with an eNB.

The UE initially accesses a target cell during a handover procedure.

The random access procedure is requested by a command of an eNB.

Data to be transmitted in UL is generated when UL time synchronization is not matched or a dedicated radio resource used for requesting radio resources is not allocated.

A recovery procedure is performed due to radio link failure or handover failure.

Based on the aforementioned description, a general contention-based random access procedure will be described below.

(1) Transmission of First Message

First, the UE may randomly select one random access preamble from a set of random access preambles indicated by system information or a handover command. Thereafter, the UE may transmit the random access preamble by selecting physical RACH (PRACH) resources capable of carrying the random access preamble.

(2) Reception of Second Message

After transmitting the random access preamble, the UE attempts to receive a random access response for the UE within a random access response reception window indicated by the system information or the handover command from the eNB [S902]. In detail, the random access response information may be transmitted in the form of a MAC PDU. The MAC PDU may be transmitted through a physical downlink shared channel (PDSCH). In addition, to appropriately receive information transmitted through the PDSCH, the UE needs to monitor a physical downlink control channel (PDCCH). That is, the PDCCH may contain information of a UE that needs to receive the PDSCH, frequency and time information of radio resources of the PDSCH, a transmission format of the PDSCH, etc. Once the UE successfully receives the PDCCH transmitted to the UE, the UE may appropriately receive the random access response transmitted through the PDSCH based on the information contained in the PDCCH. Moreover, the random access response may include a random access preamble identifier (RAPID), a UL grant indicating a UL radio resource, a temporary C-RNTI, and a timing advance command (TAC).

As described above, the random access response requires the random access preamble ID. This is because, since the random access response may include random access response information for one or more UEs, a UE capable of using the UL grant, the temporary C-RNTI, and the TAC should be indicated. Here, it is assumed that a random access preamble selected by a UE matches a random access preamble ID for the UE. Thus, the UE may receive the UL grant, the temporary C-RNTI, the TAC, etc.

(3) Transmission of Third Message

In case that the UE receives the valid random access response, the UE processes information contained in the random access response. That is, the UE applies the TAC and stores the temporary C-RNTI. In addition, the UE may store data to be transmitted in response to reception of the valid random access response in a message 3 buffer.

The UE transmits the data (i.e., the third message) to the eNB using the received UL grant. The third message needs to contain an ID of the UE. In the contention-based random access procedure, the eNB cannot determine which UE perform the random access procedure and thus the ID of the UE performing the random access procedure need to be included for later contention resolution.

To include the ID of the UE, two methods are discussed. As a first method, if the UE already has a valid cell ID assigned by a corresponding cell prior to the random access procedure, the UE transmits its C-RNTI through a UL transmission signal corresponding to the UL grant. On the other hand, if the UE is not assigned the valid ID prior to the random access procedure, the UE contains its unique ID (e.g., S-TMSI or random ID) in data and transmits the data. In general, the unique ID is longer than the C-RNTI. In case that the UE transmits data corresponding to the UL grant, the UE initiates a contention resolution timer (hereinafter referred to as a CR timer).

(4) Reception of Fourth Message

After transmitting the data including its ID through the UL grant contained in the random access response, the UE stands by an instruction of the eNB for the contention resolution. That is, in order to receive a specific message, the UE attempts to receive the PDCCH [S904]. For the PDCCH reception, two methods are discussed. As described above, when the ID of the UE in the third message, which is transmitted in response to the UL grant, is transmitted using the C-RNTI, the UE attempts to receive the PDCCH using the C-RNTI. When the ID is the unique ID, the UE may attempt to receive the PDCCH using the temporary C-RNTI contained in the random access response. In the former case, if the UE receives the PDCCH through its C-RNTI before the CR timer expires, the UE determines that the random access procedure is normally performed and then completes the random access procedure. In the latter case, if the UE receives the PDCCH through the temporary C-RNTI before the CR timer expires, the UE checks data transmitted through the PDSCH indicated by the PDCCH. If its unique ID is contained in the data, the UE determines that the random access procedure is normally performed and then completes the random access procedure.

Unlike the contention-based random access procedure illustrated in FIG. 7, a non-contention-based random access procedure is completed after transmission of the first message and the second message only. However, before the UE transmits the random access preamble as the first message to the eNB, the UE is assigned the random access preamble from the eNB. Thereafter, the UE transmits the assigned random access preamble as the first message to the eNB and then receives the random access response from the eNB. Thereafter, the random access procedure is completed.

According to the present invention, an eNB can trigger a PRACH using a PDCCH command through a PDCCH for the purpose of synchronization. Subsequently, a user equipment transmits a PRACH preamble to the eNB. The PRACH preamble transmission, which is performed by the user equipment to match synchronization initially, corresponds to contention-based PRACH preamble transmission. The eNB transmits a random access response message to the user equipment in response to the received first message.

Random Access Response Grant

The higher layer indicates a 20-bit UL grant to the physical layer. This means a random access response grant in the physical layer.

In this case, the random access grant message includes contents shown in Table 3 below as well as the TAC. Table 3 below shows information included in the random access (RA) response grant defined in 3GPP LTE TS 36.213.

TABLE 3

| Contents | Bit number |
| --- | --- |
| Hopping flag | 1 |
| Fixed size resource block assignment | 10 |
| Truncated modulation and coding scheme | 4 |
| TPC command for scheduled PUSCH | 3 |

TABLE 3-continued

| Contents | Bit number |
| --- | --- |
| UL delay | 1 |
| CSI request | 1 |

From an MSB (most significant bit) to an LSB (least significant bit), 20 bits are configured as follows.

Hopping flag: 1 bit
Fixed size resource block assignment: 10 bits
Truncated MCS (modulation and coding scheme): 4 bits
TPC (transmission power control) command for scheduled PUSCH: 3 bits
UL delay: 1 bit
CSI (channel state information) request: 1 bit If a frequency hopping (FH) field of 1 bit in a corresponding random access response grant is set to 1 and UL resource block assignment corresponds to type 0, a user equipment performs PUSCH frequency hopping. Otherwise, the UE does not perform the PUSCH frequency hopping. If a hopping flag is configured, the UE performs PUSCH hopping according to the indication indicated by a fixed size resource block assignment field.

The fixed size resource block assignment field is as follows.

First of all, if the number of UL resource blocks satisfies the condition of $N_{RB}^{UL} \leq 44$, the number b of LSBs are truncated from the fixed size resource block assignment and the truncated resource block assignment is interpreted in the same manner as that used in regular DCI format 0. In this case, the b can be expressed as Formula 1 below.

$$b = \lceil \log_2(N_{RB}^{UL} \cdot (N_{RB}^{UL}+1)/2) \rceil \qquad \text{[Formula 1]}$$

On the other hand, otherwise, the number b of MSBs, which are set to 0, are inserted to a next of the number NUP hop of hopping bits in the fixed size resource block assignment and the extended resource block assignment is interpreted in the same manner as that used in regular DCI format 0. In this case, if the hopping flag is set to 1, the number (NUP hop) of the hoping bits is 0 and the b can be expressed as shown in Formula 2 below.

$$b = (\lceil \log_2(N_{RB}^{UL} \cdot (N_{RB}^{UL}+1)/2) \rceil - 10) \qquad \text{[Formula 2]}$$

In addition, the truncated MCS can be interpreted as an MCS corresponding to the random access response grant.

A TPC command ($\delta_{msg\,2}$) is used for setting power of a PUSCH and can be interpreted according to Table 4 below.

Table 4 shows the TPC command ($\delta^{\delta_{msg\,2}}$) for a scheduled PUSCH.

TABLE 4

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, whether to include non-periodic CQI, PMI, and RI reporting in corresponding PUSCH transmission can be determined by a CSI request field. On the contrary, in a contention based random access procedure, the CSI request field is reserved.

The UL delay is applied to both a TDD system and an FDD system. To indicate whether a delay in a PUSCH is introduced, the UL delay can be set to either 0 or 1.

A Case of Having a Plurality of TAs

Figure 11:
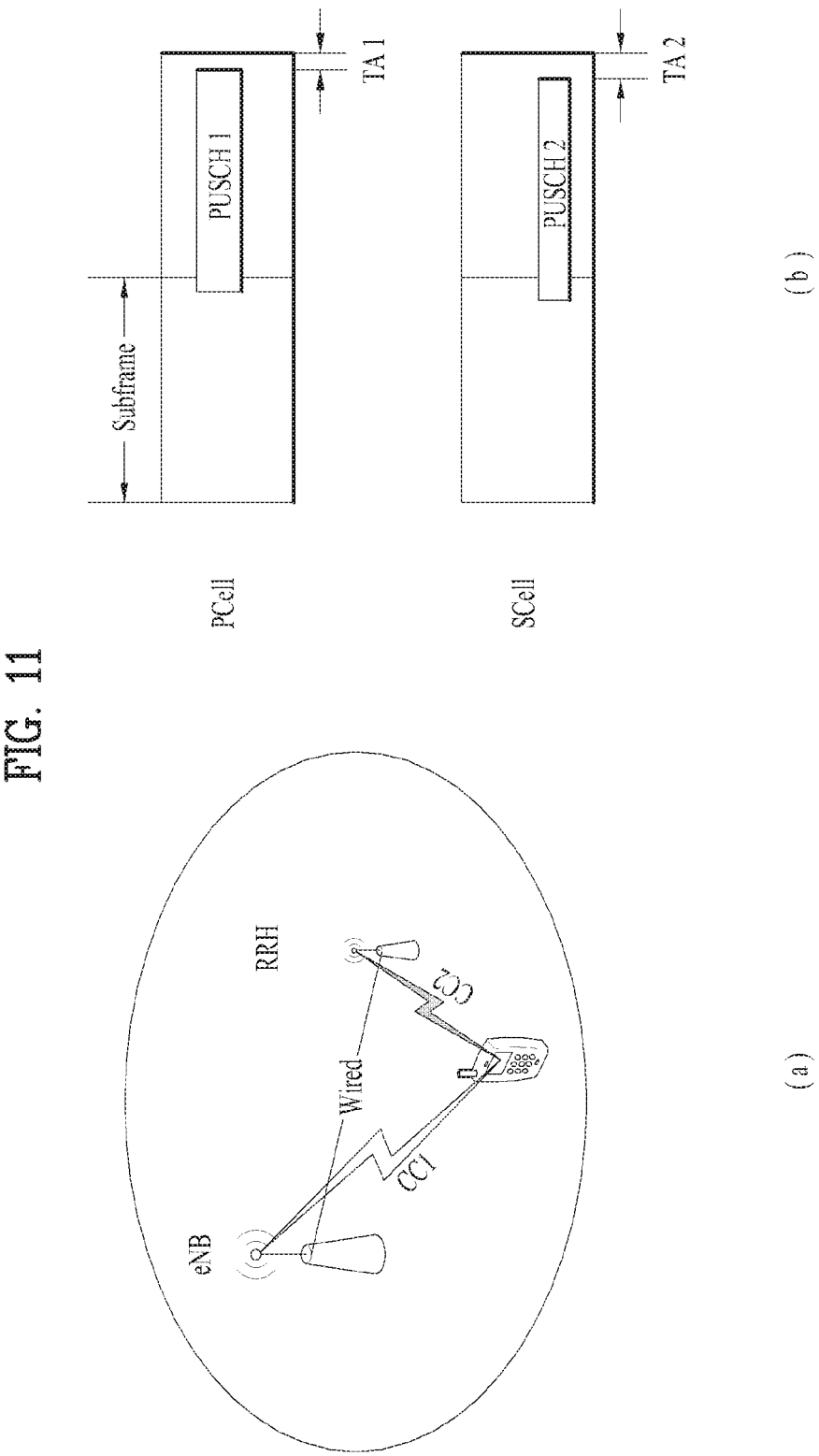
FIG. 11 illustrates an example of aggregating a plurality of cells with different frequency characteristics.

FIG. 11 illustrates an example of aggregating a plurality of cells with different frequency characteristics. In the LTE Release 8/9/10 system, when performing aggregation of a plurality of CCs, a UE commonly applies a timing advance (TA) value that can be applied to one CC (e.g., PCell or P carrier) to the plurality of the CCs and then uses it for UL transmission. On the other hand, in the LTE-A system, a UE may be allowed to aggregate a plurality of cells belonging to different frequency bands (i.e., separated far from each other in the frequency domain), a plurality of cells with different propagation characteristics, or a plurality of cells with different coverage. Moreover, in case of a specific cell, it may be considered that RRH (remote radio header) devices such as a repeater are deployed within the cell for the purpose of coverage expansion or coverage hole elimination. For instance, inter-site carrier aggregation may be performed between cells formed in different locations. Here, the RRH can be referred to as a remote radio unit (RRU). The eNB and RRH (or RRU) can be referred to as a node or a transmitting node.

For instance, referring to FIG. 11(a), a UE aggregates two cells (i.e., cell 1 and cell 2). The cell 1 (or cc 1) may be formed to perform direct communication with an eNB without the RRH and the cell 2 may be formed to use the RRH due to limited coverage. In this case, a propagation delay (or eNB's reception timing) of a UL signal transmitted from a UE through the cell 2 (or CC 2) may be different from a propagation delay (or eNB's reception timing) of a UL signal transmitted through the cell 1 due to a location of the UE, frequency characteristics, etc. When a plurality of cells have different propagation delay characteristics as described above, multiple timing advances (TAs) are inevitable.

FIG. 11(b) illustrates a plurality of cells with different TAs. Referring to FIG. 11(b), a UE aggregates two cells (e.g., PCell and SCell). The UE may transmit a UL signal (PUSCH) by applying different TA to each of the two cells.

In case that the UE receives a plurality of TAs, if a UL signal transmission timing of a specific cell (e.g., PCell) is significantly different from that of a different cell, a method of restricting uplink signal transmission in a corresponding cell may be considered. For instance, if a gap between the transmission timings is higher than a specific threshold value, the method of the restricting uplink signal transmission in the corresponding CC may be considered. The specific threshold value may be configured as a higher signal or it may be informed to the UE in advance. For instance, if UL signals transmitted from the UE have significantly different transmission timings, it may cause an irregular UL/DL signal transmission timing relationship between the UE and the eNB. That is, the method is required to prevent malfunction caused by the irregular UL/DL signal transmission timing relationship between the UE and the eNB.

Moreover, if a difference between timings for transmitting PUSCH/PUCCH and the like, which are transmitted to different cells in the same subframe by a single UE, it may increase complexity of UL signal configuration and response time adjustment between DL and UL.

Accordingly, when uplink transmission timings between a plurality of cells are significantly different from each other due to an independent TA operation, a scheme for dropping transmission of uplink signals (e.g., PUSCH, PUCCH, SRS, RACH, etc.) of a UE or a scheme for limiting a transmission timing may be considered. Particularly, the present invention proposes the following schemes.

Scheme 1)

If a TA difference between a plurality of cells in which a UE needs to perform UL transmission is equal to or higher than a threshold, the UE always drops uplink transmission to a random cell to maintain a TA difference between actually transmitted uplink signals below the threshold at all times. In this case, the UE may drop uplink signal transmission to a cell, of which a TA difference exceeds the threshold with reference to a specific cell. More particularly, the specific cell may be a PCell or belong to a PCell group. Alternatively, the specific cell may be configured by a network through RRC signaling, etc. Here, an operation of dropping the uplink signal transmission may include an operation of not transmitting a signal of which transmission is previously configured, an operation of not expecting or discarding a command of scheduling PUSCH for a corresponding cell when the TA difference exceeds the threshold.

Scheme 2)

If a TA difference between a plurality of cells in which a UE needs to perform UL transmission is equal to or higher than a threshold, the UE adjusts an uplink transmission timing for a random cell to maintain a TA difference between the transmission timing for the random cell and a transmission timing for another cell below the threshold. In this case, the UE may adjust a transmission timing of an uplink signal for a cell, of which a TA difference exceeds the threshold with reference to a specific cell. Here, the specific cell may be a PCell or belong to a PCell group. Alternatively, the specific cell may be configured by a network through RRC signaling, etc.

Scheme 3)

If a UE receives a TAC (timing advance command) with a TA difference between a plurality of cells, in which the UE needs to perform UL transmission, equal to or higher than a threshold, the UE discards the corresponding TAC or limitedly applies the TAC only when the TA difference is lower than the threshold. In this case, the UE may apply the scheme 3 only when receiving TAC of which a TA difference exceeds the threshold with reference to a specific cell. Here, the specific cell may be a PCell or belong to a PCell group. Alternatively, the specific cell may be configured by a network through higher layer signaling (e.g., RRC signaling), etc.

In the above schemes, the TA threshold value may be configured by the network through higher layer signaling (e.g., RRC signaling), etc. In addition, the cell may include a cell group, and more specifically, a cell group to which the same TAC is applied. Moreover, the TA difference may include a difference between TA values managed by a UE, a difference between TA values that a UE needs to apply to transmission of a specific subframe, a difference between values of TACs received by a UE, or a difference between transmission timings which a UE needs to apply to transmission. Furthermore, when PRACH, i.e., a signal corresponding to exception of TA application controlled by a TAC value is transmitted, the TA difference limitation scheme may not be applied.

Reference Signal

Hereinafter, a reference signal will be described in detail.

In general, a reference signal previously known to both a transmitter and a receiver is transmitted along with data from the transmitter to the receiver for channel measurement. The reference signal provides a modulation scheme as well as channel measurement so that a demodulation process is performed. The reference signal is classified into a dedicated RS (DRS) for an eNB and a specific UE, i.e., a UE-specific reference signal and a cell-specific reference signal (CRS) for all UEs in a cell, i.e., a common RS. In addition, the CRS includes a reference signal used for a UE to measure CQI/PMFRI and report the same to the eNB, which is referred to as a channel state information reference signal (CSI-RS).

The CRS (common reference signal) corresponding to the cell-specific reference signal transmitted for channel measurement and data demodulation may be transmitted to the UE over a control information region as well as a data information region.

In addition, a DL DM-RS (demodulation-RS) corresponding to the UE-specific RS supports single antenna port transmission through a data region, i.e., a PDSCH. Whether the DM-RS corresponding to the UE-specific RS is present is signaled to the UE through a higher layer. In 3GPP standard document 36.211, DM-RSs for antenna ports 7 to 14, i.e., total 8 antenna ports are defined.

FIG. 9 illustrates an example of mapping DL DM-RSs defined in the current 3GPP standard document. Referring to FIG. 9, DM-RSs corresponding to antenna ports {7, 8, 11, 13} are mapped to DM-RS group 1 using a sequence per antenna port and DM-RSs corresponding to antenna ports {9, 10, 12, 14} are mapped to DM-RS group 2 using a sequence per antenna port.

Meanwhile, unlike the CRS, the above-described CSI-RS has been proposed for the purpose of channel measurement with respect to the PDSCH. Different from the CRS, the CSI-RS can be defined to have maximum 32 different resource configurations to reduce inter-cell interference (ICI) in a multi-cell environment.

Synchronization Signal

Hereinafter, a synchronization signal will be described.

When a UE is powered on or intends to access a new cell, the UE performs an initial cell search procedure for obtaining time and frequency synchronization with respect to the cell and detecting physical layer cell identity NcellID of the cell. To this end, the UE perform synchronization with an eNB by receiving synchronization signals, for example, a primary synchronization signal (PSS) and a secondary synchronization signal (SSS) from the eNB and then acquires information such as a cell identifier, etc.

Specifically, 63-length of a Zadoff-Chu (ZC) sequence is defined in the frequency domain according to Formula 3 below so that the PSS obtains time domain synchronization and/or frequency domain synchronization such as OFDM symbol synchronization, slot synchronization, etc.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Formula 3]}$$

In Formula 3 above, u indicates a ZC root sequence index and it is defined in the current LTE system as show in Table 5 below.

TABLE 5

| $N_{ID}^{(2)}$ | Root index u |
|---|---|
| 0 | 25 |
| 1 | 29 |
| 2 | 34 |

Next, the SSS is used to obtain frame synchronization, a cell group ID and/or a CP configuration of the cell (i.e., information on the use of normal CP or extended CP). In addition, the SSS is configured with an interleaved combination of two length-31 binary sequences. That is, the SSS sequences, d(0), . . . , d(61) has total 62-length. Moreover, as shown in Formula 4 below, different SSS sequences are defined according to whether the SSS sequence is transmitted in subframe #0 or subframe #5. In Formula 4, n is an integer between 0 and 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Formula 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

More specifically, the synchronization signals are transmitted in the first slot of subframe #0 and the first slot of subframe #5 in consideration of a global system for mobile communication (GSM) frame length of 4.6 ms for facilitation of inter-radio access technology (inter-RAT) measurement. Especially, the PSSs are transmitted in the last OFDM symbol of the first slot of the subframe #0 and in the last OFDM symbol of the first slot of the subframe #5, and the SSSs are transmitted in the second to the last OFDM symbol of the first slot of the subframe #0 and in the second to the last OFDM symbol of the first slot of the subframe #5. That is, a boundary of a corresponding radio frame may be detected through the SSS. The PSS is transmitted from the last OFDM symbol of a corresponding slot and the SSS is transmitted from an OFDM symbol immediately before the OFDM symbol in which the PSS is transmitted.

An SS may represent a total of 504 unique physical layer cell IDs through combinations of 3 PSSs and 168 SSSs. In other words, the physical layer cell IDs are grouped into 168 physical layer cell ID groups, each of which includes three unique IDs so that each physical layer cell ID is a part of only one physical layer cell ID group. Thus, a physical layer cell ID $N^{cell}_{ID}$ is uniquely defined with a number $N^{(1)}_{ID}$ in the range of 0 to 167 indicating a physical layer cell ID group and a number $N^{(2)}_{ID}$ from 0 to 2 indicating a physical layer ID in the physical layer cell ID group. A UE can obtain one of the three unique physical layer IDs by detecting the PSS and then identify one of the 168 physical layer cell IDs associated with the physical layer ID in a manner of detecting the SSS.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID (identity). Thereafter, the UE may receive intra-cell broadcast information managed by the eNB on a PBCH.

D2D (Device-to-Device) Communication

For D2D communication introduced in the aforementioned wireless communication system (e.g., 3GPP LTE system or 3GPP LTE-A system), schemes for performing the D2D communication will be described in detail.

First of all, a device-to-device communication environment applicable to the present invention will be described in brief.

The D2D communication refers to communication between an electronic device and another electronic device. In a broad sense, the D2D communication refers to wire or wireless communication between electronic devices or communication between a machine and a device controlled by a user. Recently, the D2D communication may generally mean wireless communication between electronic devices operating without human involvement.

Figure 12:
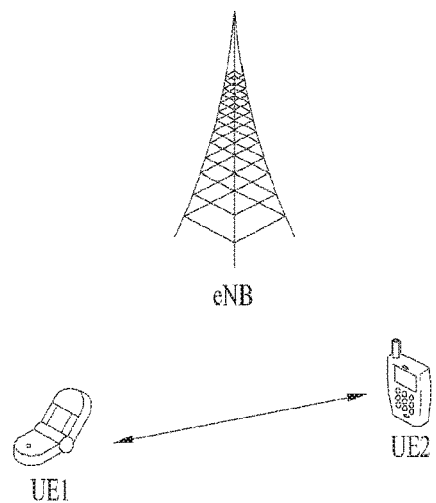
FIG. 12 illustrates a communication system applicable to the present invention.

FIG. 12 is a conceptual diagram for explaining D2D communication. In FIG. 12, a device-to-device or UE-to-UE communication scheme is illustrated as an example of the D2D communication. According to this scheme, data can be exchanged between UEs without intervention of an eNB. A direct link established between devices can be referred to as a D2D link or a side link. Compared to the conventional eNB-based communication, the D2D communication has advantages in that latency is reduced and the amount of required resources is small. Here, the UE means a terminal of a user. However, if a network equipment such as an eNB transmits and receives signals according to the communication scheme between UEs, the network equipment can also be considered as the UE.

To perform the D2D communication, two UEs need to synchronize with each other in time and frequency. In general, when the two UEs are in coverage of the eNB, the two UEs synchronize with each other through a PSS/SSS, a CRS, and the like transmitted by the eNB, and time/frequency synchronization can be maintained at such a level that the two UEs can directly transmit and receive signals with each other. In this case, a synchronization signal for the D2D communication is referred to as a D2DSS. The D2DSS may include signals such as the PSS/SSS used in the LTE system. The PSS/SSS (or signals obtained by modifying the PSS/SSS) are respectively referred to as a PD2DSS (primary D2D synchronization signal) and an SD2DSS (secondary D2D synchronization signal). Similar to the PSS of the LTE system, the PD2DSS may be used to obtain an approximate timing and be created based on the ZC sequence. Moreover, similar to the SSS of the LTE system, the SD2DSS may be used for more accurate synchronization and be created based on the m-sequence. A physical D2D synchronization channel (PD2DSCH) means a channel for carrying such information necessary for synchronization as a system bandwidth, a radio frame, a subframe index, and the like.

A structure of the synchronization reference signal proposed in the present invention (hereinafter referred to as the D2DSS) will be described in the following. More specifically, requirements that may be considered for D2DSS design will be explained in the sections A to D. Such requirements may be applied selectively or at least two requirements may be applied together.

A. D2DSS Waveform and the Necessity of SD2DSS

For D2D transmission and reception, the D2DSS is proposed to have the following structure.

Proposal 1): It is proposed that the D2DSS is configured with the PD2DSS only. In this case, it is also proposed that the PD2DSS has the same waveform as that of the LTE PSS. Synchronization reference ID can be obtained by detecting a DM RS of an associated PD2DSCH.

If a waveform of the PD2DSS is the same as that of the LTE PSS, it has advantages in that implementation of the existing UE can be reused to the maximum extent for the synchronization. Moreover, according to the above discussion, it is possible to reduce specific effort required to design the detailed waveform of the PD2DSS. Thus, it is proposed to reuse a waveform of the LTE PSS in each symbol containing the PD2DSS. This may mean that the PD2DSS is transmitted during OFDM modulation used in the case of DL signals, with DC (direct-current) carrier puncturing and no half-subcarrier shifting.

If the same principle is applied to the SD2DSS, a waveform of the LTE SSS may cause high PAPR (Peak-to-Average Power Ratio) which will reduce coverage of the synchronization. This is because PAPR of the M-sequence usually is higher than that of the ZC sequence. Thus, it is proposed that in some cases the D2DSS consists of the PD2DSS only. In addition, it is proposed that when a DM RS sequence of the PD2DSCH is derived or calculated from the synchronization reference ID, the synchronization reference ID is identified by using the DM RS of the PD2DSCH associated with the D2DSS. In this case, the synchronization reference ID may be interpreted as follows. A D2D synchronization reference signal transmitted by a UE may be obtained by modifying a sequence or resource mapping of the PSS/SSS used in the conventional LTE system. In this case, a cell ID may be interpreted as a seed value for determining the sequence used in the PSS/SSS. Thus, the cell ID can be referred to as the synchronization reference ID in that it is used as the reference for the synchronization.

B. The Number of Symbols Used for PD2DSS in One Subframe

Multiple symbols can be used for the PD2DSS in one subframe. For instance, at least four symbols may be used for usage of the PD2DSS in one subframe containing the D2DSS.

According to the currently discussed standardization process (RAN4 feedback), on oscillator error in each UE can be up to 10 PPM and a maximum error in a D2D link (between a transmitting UE and a receiving UE) can be 20 PPM. According to a working assumption, a period of the D2DSS is not smaller than 40 ms and a time error accumulated during 40 ms can be up to 0.8 μs. Considering that 1 time sampling in a 6-RB system is about 0.5 μs, it is difficult to assume that a UE can coherently combine D2DSSs transmitted in different periods that are separated at least by 40 ms. Moreover, the D2DSS period may significantly depend on application. For example, if the D2DSS is used to assist synchronization for inter-cell D2D discovery, the D2DSS period can be longer than 1 sec in order to be aligned with a period of a discovery resource pool.

Figure 13:
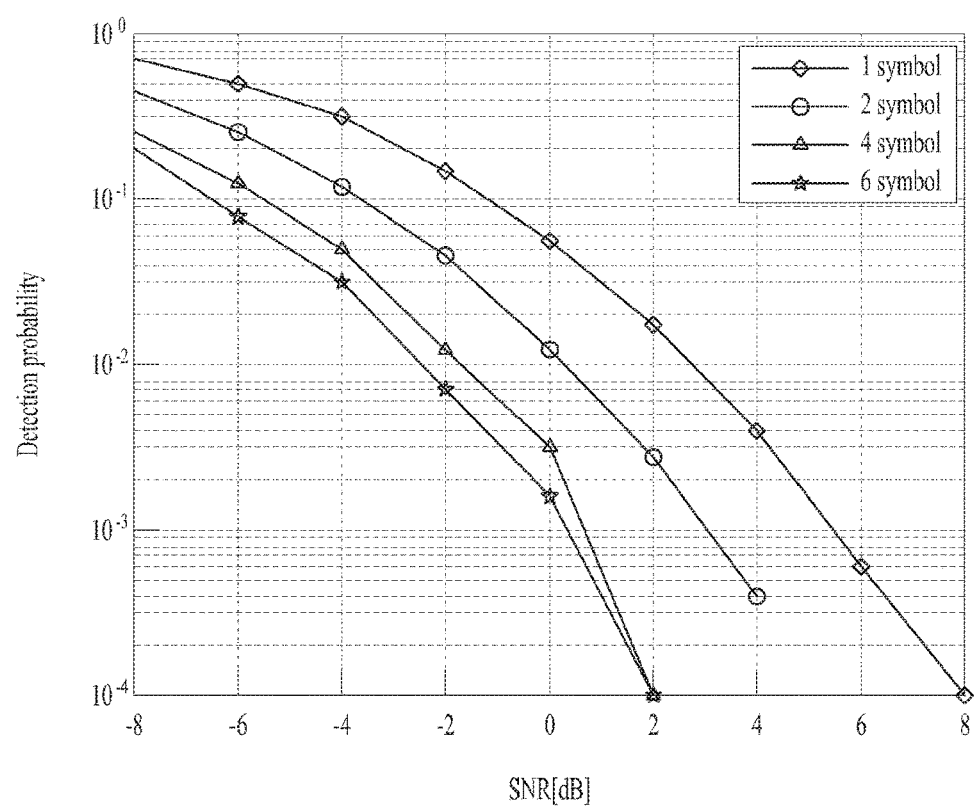
FIG. 13 is a diagram illustrating a D2DSS detection error according to the number of symbols used for a D2DSS.

On the other hand, each UE may be able to receive enough D2DSS energy in order to guarantee sufficient coverage of the D2DSS. FIG. 13 shows a D2DSS detection error according to the number of symbols used for the D2DSS. When multiple symbols are used, a transmitter repeatedly uses the same root index which is randomly selected from the three root indices defined for the PSSs. In this case, the three root index may correspond to {25, 39, 34}. If an error between an estimated D2DSS transmission initiation time and an actual time is covered by the CP (cyclic prefix), the D2DSS may be considered to be correctly detected. Considering that SNR (signal to noise ratio) of −2.78 dB in 6-RB transmission corresponds to pathloss of −107 dBm in RSRP, the multiple symbols should be combined to obtain sufficient time acquisition performance even in the case of zero frequency offset.

Based on the above discussion, it is proposed to use multiple PD2DSSs in a single subframe. If a target error probability of single period time acquisition is about 1%, at least four symbols may be used.

C. Root Index Used for Multi-Symbol PD2DSS in One Subframe

It should be determined which root index is used for each PD2DSS symbol in one subframe. Hereinafter, a method for determining a root index for each symbol when multiple symbols are used for a PD2DSS is proposed. As one simple method, the same root index may be used for all respective PD2DSS symbols. However, such a repeated root index will cause at least two problems described below. Thus, it is proposed to mix and use a plurality of root indices such that different symbols use different PD2DSS sequences.

One problem of the repeated root indices is the ambiguity of a symbol index. In case that N symbols with the same index are used for the PD2DSS, if a receiving UE misses the first symbol, for example, due to high noise power, AGC (automatic gain control) setting, and/or switching between transmission and reception, the receiving UE cannot be aware of a location of the subframe boundary even after detecting the remaining (N−1) PD2DSS symbols. However, if the root index of PD2DSS changes according to the symbol index, such ambiguity can be resolved.

Figure 14:
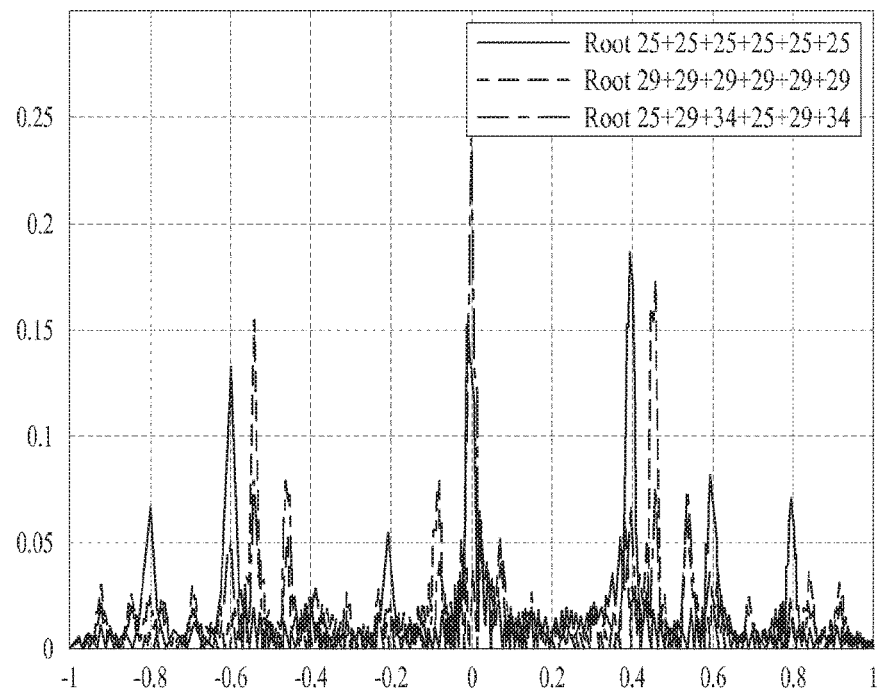
FIG. 14 is a diagram illustrating aperiodic autocorrelation profiles of a multi-symbol PD2DSS for a mixed root index and/or a repeated root index.

The other problem of the repeated root indices is a high correlation peak of a non-zero time shift when a high frequency offset is present. FIG. 14 is a diagram illustrating aperiodic autocorrelation profiles of a multi-symbol PD2DSS for a mixed root index and/or a repeated root index in the case of 7 kHz frequency offset. Specifically, referring to FIG. 14, the aperiodic autocorrelation profiles for repeated root indices 25 and 29 shows relatively high peaks observed at non-zero time shifts. In addition, FIG. 14 shows the autocorrelation of the PD2DSS with the mixed root index. In this case, an average of side peaks is significantly decreased because time shifts of the side peaks are changed according to different root indices. Here, x axis and y axis indicate time and frequency, respectively.

Figure 15:
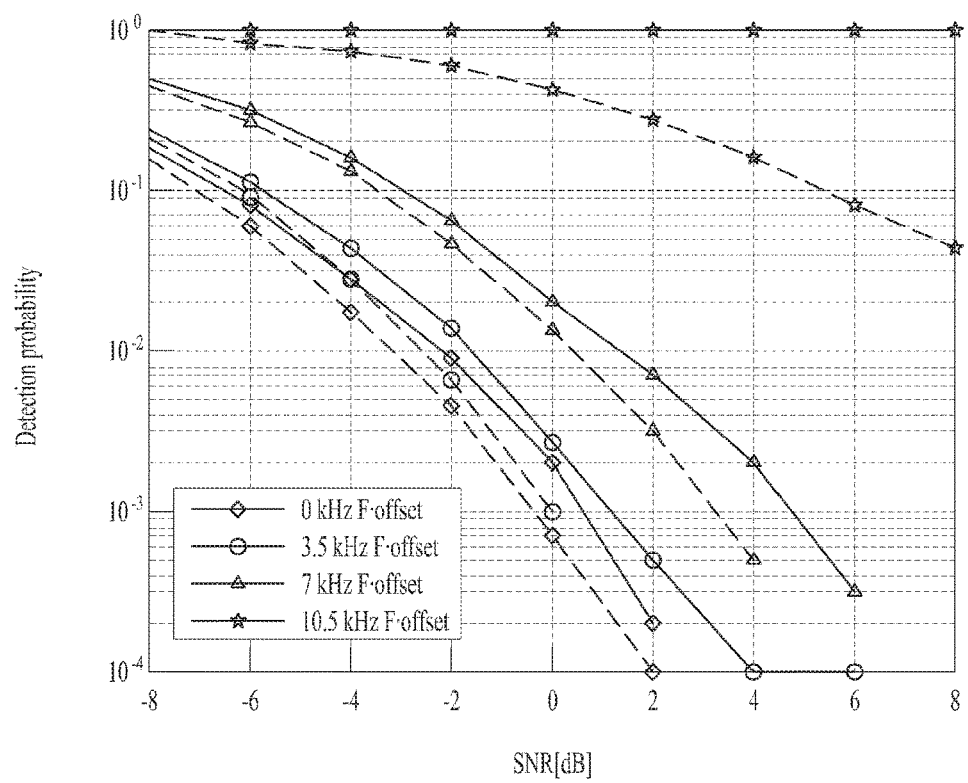
FIG. 15 illustrates a PD2DSS detection error when six symbols are used for a PD2DSS.

FIG. 15 illustrates a PD2DSS detection error when six symbols are used for a PD2DSS. One of two root index patterns is randomly selected in each transmission. Patterns {25-25-25-25-25-25} and {29-29-29-29-29-29} are considered for the repeated index, and {25-29-34-25-29-34} and {29-25-34-29-25-34} are considered for the mixed index. In FIG. 15, a solid line indicates the repeated root index case and a dotted line indicates the mixed root index case. Referring to FIG. 15, it can be observed that it is beneficial to mix multiple root indices in transmitting PD2DSS over multiple symbols due to the two discussed problems. Thus, the root index of the PD2DSS sequence may be configured to be changed according to the symbol index when multiple symbols are used for PD2DSS transmission in one subframe.

Meanwhile, referring to FIG. 15, it can also be observed that even though the mixed root index can provide gain over the repeated root index, PD2DSS detection performance becomes very poor when the frequency offset is very high (e.g., 10.5 kHz). Such a high frequency offset can be handled by the two following approaches:

A receiving UE may operate according to a plurality of hypotheses on the frequency offset such that the receiving UE can correctly match a transmitted D2DSS under the high frequency offset.

The PD2DSS is preceded by a preamble which has a shorter symbol length (e.g., SRS) such that the receiving UE can recognize the high frequency offset before detecting the PD2DSS.

D. Further Study is Necessary on how to Deal with Very High Frequency Offset in Designing D2DSS.

Hereinafter, a description will be given of a structure of a synchronization signal to which the aforementioned proposals are either applied or not.

FIG. 16 is a diagram for explaining an example of a synchronization signal structure applicable to the present invention. FIG. 16 (a) illustrates an example of a preamble transmitted before a PD2DSS. Referring to FIG. 16 (a), the same sequence (signal A) is repeated twice within the first symbol (symbol #0) which is used for the preamble. In addition, three symbols are assumed as a PD2DSS (signal B, B', B"). This effectively means that a symbol length of the preamble is half of normal symbols containing the PD2DSS. Moreover, it is also seen that there can be some gap between the preamble and the PD2DSS as well as two PD2DSS symbols during a UE processing time.

The preamble shown in FIG. 16 (a) can be generated by padding zero in each odd (or even) numbered subcarrier in the frequency domain. This is because periodic '0' (i.e., zero) insertion in the frequency domain may be considered as signal repetition in the time domain. FIG. 16 (b) shows signal generation in the frequency domain based on the above-mentioned structure. Here, a method used for SRS transmission can be adopted because the comb-like nature of an SRS has the same property. However, this structure can be generalized such that a preamble signal is repeated N times in a symbol by repeating a loading signal on a single carrier and nulling following (N−1) subcarriers.

When multiple symbols are used for PD2DSS transmission, it is beneficial to change the root index in every symbol. Assuming that there are three sequences available for a PD2DSS in each symbol (referred to as signals $a_1$, $a_2$, and $a_3$), two sequence patterns can be included in a candidate set as follows. This is because there is no case where the two sequences overlap in consecutive symbols.

Pattern 1: $\{a_1, a_2, a_3, a_1, a_2, a_3, \ldots\}$
Pattern 2: $\{a_1, a_3, a_2, a_1, a_3, a_2, \ldots\}$ Before changing to another sequence, each sequence can be repeated twice as shown in the following.

Pattern 3: $\{a_1, a_1, a_2, a_2, a_3, a_3, a_1, a_1, \ldots\}$
Pattern 4: $\{a_1, a_1, a_3, a_3, a_2, a_2, a_1, a_1, \ldots\}$ To create different initial sequences in different patterns, it is also possible to apply cyclic shift in any of the above patterns.

The above mentioned patterns can be generalized to encompass the case where N distinctive sequences are available for the PD2DSS in each symbol (referred to as signals $a_1$, $a_2$, $a_3$, ..., $a_N$) as follows.

Pattern n in group 1: Different signals are transmitted in the adjacent symbols and the signal index increases by n in each symbol. That is, the pattern may correspond to $\{a_1, a_{1+n}, a_{1+2n}, \ldots\}$. In this case, a modulo operation can be included so that the signal index is in the range of [1, N].

Pattern n in group 2: The same signal is repeated in two adjacent symbols and the signal index increases by n. That is, the pattern may correspond to $\{a_1, a_1, a_{1+n}, a_{1+n}, a_{1+2n}, a_{1+2n}, \ldots\}$.

Pattern n in group k: The same signal is repeated in k adjacent symbols and the signal index increases by n.

Embodiment 1

FIG. 17 illustrates a method of arranging PD2DSSs when a plurality of symbols are used for the PD2DSSs as one embodiment of the present invention. Hereinafter, a symbol used for a PD2DSS is referred to as a PD2DSS symbol. FIG. 17 (a) illustrates a case in which a plurality of PD2DSS symbols are arranged apart from each other by the same distance within one subframe. FIG. 17 (b) illustrates a case in which PD2DSS symbols are arranged such that a gap between two PD2DSS symbols is different from that between other two PD2DSS symbols. Hereinafter, a gap between PD2DSS symbols is referred to as an inter-PD2DSS gap. Although FIG. 17 illustrates an example of the extended CP, the present invention can be applied to the normal CP. In addition, Although FIG. 17 shows a case in which the number of PD2DSS symbols is four, the number of the PD2DSS symbols can be set greater or less than four.

Embodiment 1-1

Referring to FIG. 17 (a), four PD2DSS symbols can be arranged within one subframe such that the PD2DSS symbols have uniform 2-symbol gap. In detail, the PD2DSS symbols may be located at the second symbol (symbol #1), fifth symbol (symbol #5), eighth symbol (symbol #8), and eleventh symbol (symbol #10), respectively. If a receiver has a time shift of 3 symbols, the PD2DSS symbols may overlap in every 3 symbols. In other words, from the perspective of the receiver, PD2DSS symbol overlapping may be observed in the second symbol (symbol #1), fifth symbol (symbol #4), and eighth symbol (symbol #7).

The above overlapping may result in relatively high correlation between a transmitted PD2DSS signal and what is estimated by the receiver. This problem can be mitigated if the inter-PD2DSS gap becomes irregular as shown in FIG. 17 (b).

Embodiment 1-2

When the PD2DSS symbols are arranged such that a gap between two adjacent PD2DSS symbols (i.e., inter-PD2DSS gap) is different as much as possible, it can provide benefit. In other words, it may be used if a gap between the first PD2DSS symbol (symbol #1) and the second PD2DSS symbol (symbol #2) is different from a gap between the second PD2DSS symbol (symbol #2) and the third PD2DSS symbol (symbol #5). The effect of having such a different gap is that any non-zero symbol shift in the time domain does not cause PD2DSS overlapping in multiple symbols.

Specifically, according to the PD2DSS symbol location shown in FIG. 17 (b), overlapping occurs in only one PD2DSS symbol with respect to any non-zero symbol level time shift. For instance, when the time shift of 3 symbols exist in the receiver as shown in FIG. 17 (b), overlapping occurs only in the third symbol (symbol #2). Thanks to this property, the problem of the symbol level ambiguity can be solved without using different root indices in the PD2DSS pattern. Although FIG. 17 shows that the number of PD2DSS symbols of one subframe is four, the scope of the present invention is not limited thereto. That is, the number of the PD2DSS symbols can be greater or less than four. In addition, at least part of the symbols not used for the PD2DSS can be used for transmitting other signals such as an SD2DSS and/or a PD2DSCH.

Figure 18:
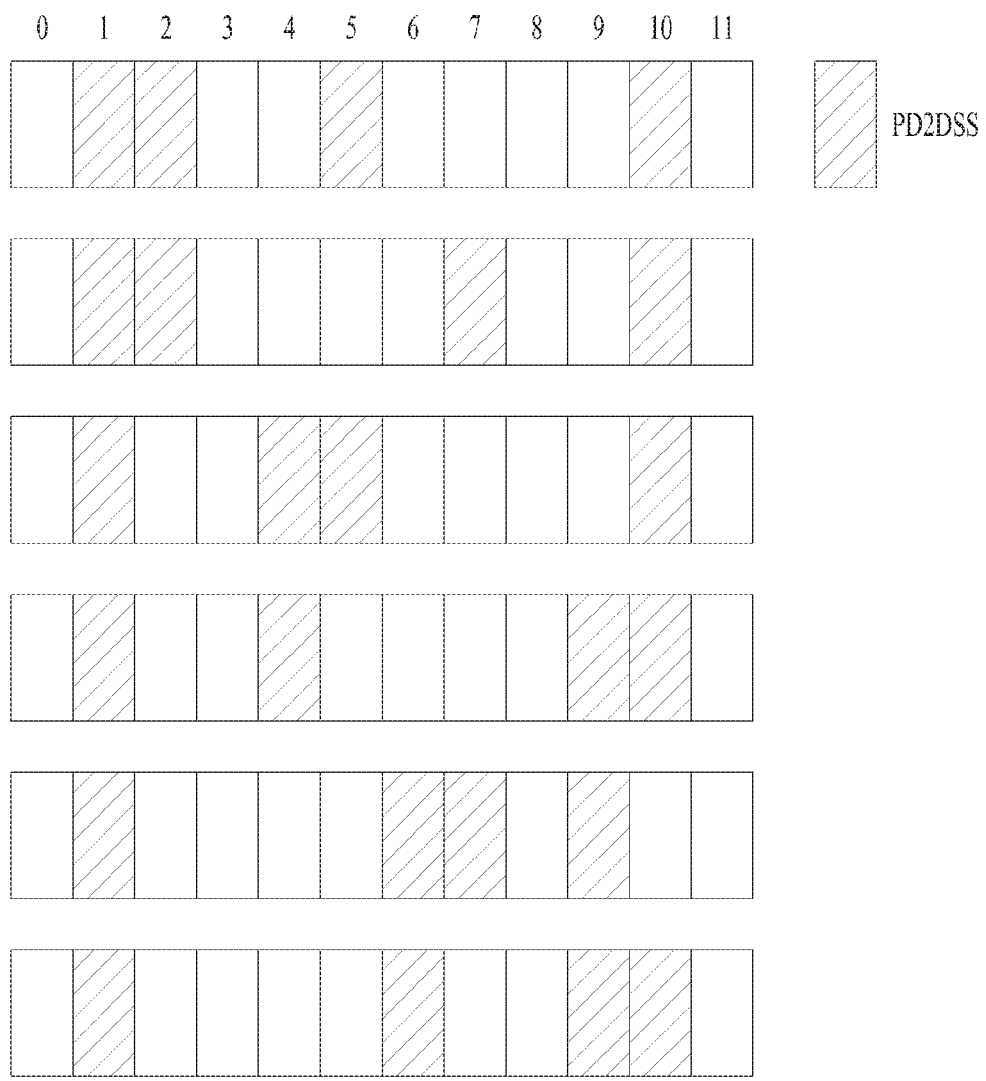
FIG. 18 illustrates an embodiment in which PD2DSSs are irregularly arranged on OFDM symbols within one subframe as another embodiment of the present invention.

FIG. 18 illustrates particular examples of irregular PD2DSS symbol locations in one subframe based on the description in FIG. 17 (b). FIG. 17 (b) shows that gaps between every two adjacent symbols are 0, 2, and 4 symbols but FIG. 18 shows examples of using such gaps according to different orders.

Referring to FIG. 18, it can be seen that patterns in the respective examples have the same property on the number of overlapping PD2DSS symbols. This is because relative gap between two adjacent PD2DSS symbols is maintained. In some cases, the PD2DSS symbols can be shifted in the time domain. For example, the pattern shown in the third example can be shifted by one symbol such that the two consecutive PD2DSS symbols are located in the middle of the subframe (i.e., symbols #5 and #6).

Figure 19:
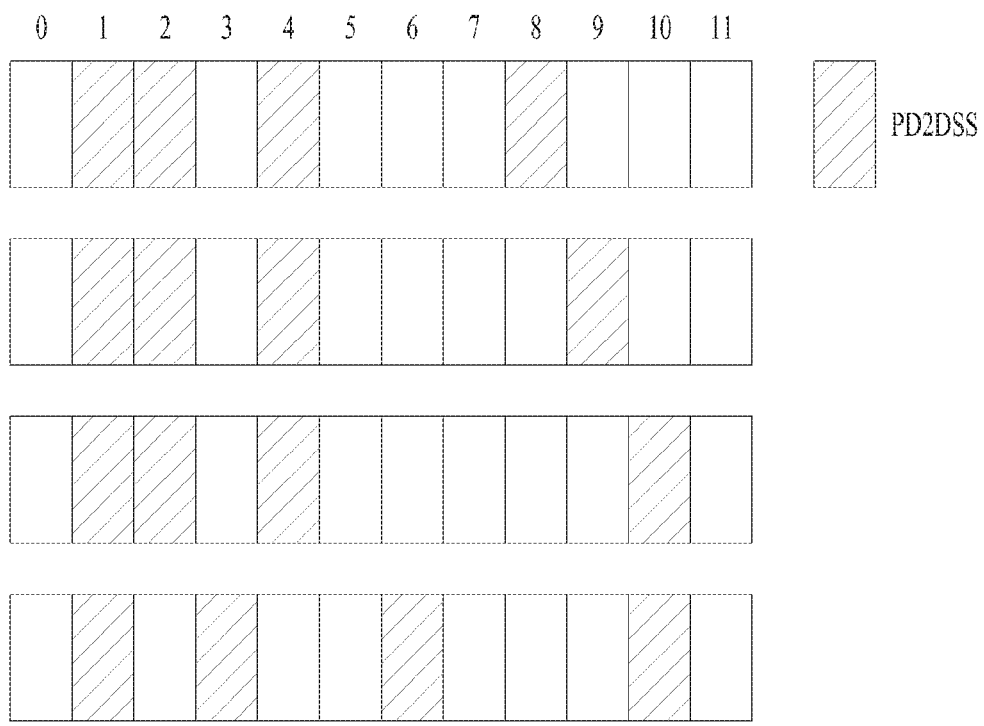
FIG. 19 illustrates an example of a pattern of an inter-PD2DSS symbol gap.

FIG. 19 illustrates an example of another inter-PD2DSS symbol gap pattern.

The first pattern {0, 1, 3}
The second pattern {0, 1, 4}
The third pattern {0, 1, 5}
The fourth pattern {1, 2, 3}

In this case, it is possible to use the same set of inter-PD2DSS gaps in a different order. Further, if symbol #0 and #11 are used for PD2DSS transmissions or the number of symbols in a subframe increases, more patterns can be used.

Hereinafter, a description will be given of another embodiment for a method of positioning a D2DSS. In the following embodiments, it is assumed that four symbols are used for a D2DSS in one subframe similar to the embodiment 1, but two of them may be PD2DSS symbols and the rest of them may be SD2DSS symbols. However, the number of D2DSS symbols is not limited to four and the number of PD2DSS symbols and the number of SD2DSS symbols are not limited to two, respectively.

Hereinafter, requirements that may be considered for D2DSS design will be explained. The conventional PUSCH DM RS can be considered in positioning the D2DSS. The D2DSS can be transmitted in the same subframe as a different channel, for example, a PD2DSCH carrying various synchronization related information. Moreover, in this case, a DM RS for demodulating the PD2DSCH can be transmitted together. If a structure of a PUSCH is reused for the PD2DSCH, a location of the DM-RS can also be maintained preferably. Accordingly, it may be required that the D2DSS is located at a position different from those of the PUSCH DM RS or PD2DSCH DM RS.

Next, two D2DSSs can be designed to be located in consecutive symbols. According to the above design, when an initial frequency offset is high, it is possible to facilitate frequency error estimation based on channel variation between symbols due to the high frequency offset component by using two adjacent D2DSS symbols. For instance, among a total of four D2DSS symbols, two D2DSS symbols may be adjacent to each other and the other two D2DSS symbols may also be adjacent to each other. However, the two consecutive D2DSS symbols may be located apart from the other two consecutive D2DSS symbols by a predetermined distance. The two consecutive D2DSS symbols may have the same type (i.e., PD2DSS or SD2DSS). In this case, since the same sequence is used in the two consecutive D2DSS symbols, channel variation can be easily detected and thus the frequency offset estimation based measurement of the channel variation between symbols can also be facilitated. On the other hand, the two consecutive D2DSS symbols may have different type (i.e., one of them is the PD2DSS and the other one is the SD2DSS). In this case, it has advantages in that the conventional LTE FDD synchronization signal structure in which the PSS and SSS are adjacent to each other can be reused.

Moreover, the last symbol of a subframe can be designed to be used as a gap for preparing signal transmission in a next subframe. In addition, it may be assumed that the D2DSS transmission cannot be performed in the gap.

Further, the D2DSS can be located in consideration of a symbol location to which the DM RS is allocated. Specifically, other symbols except the D2DSS symbols can be configured to be concentrated as nearly in the middle as possible. In other words, symbols not used for the D2DSS may be configured to be located as consecutively as possible. In this case, when the corresponding symbols are used for a different channel e.g., the PD2DSCH, the maximum number of symbols between two DM RSs can be utilized for usage of a different channel, e.g., data channel. Moreover, in this case, channel estimation performance can be improved through interpolation between the DM RS symbols. This is because in the case of a symbol located between RS symbols, channel estimation can be improved due to interpolation through the two RSs but in the case of a symbol located outside the RS symbols, channel estimation improvement cannot be achieved. Accordingly, the D2DSS arrangement pattern can be designed by reflecting the channel estimation improvement.

Based on the above-described requirement, various embodiments for a method of positioning a D2DSS will be described in the following.

Embodiment 2

Embodiment 2-1

Figure 20:
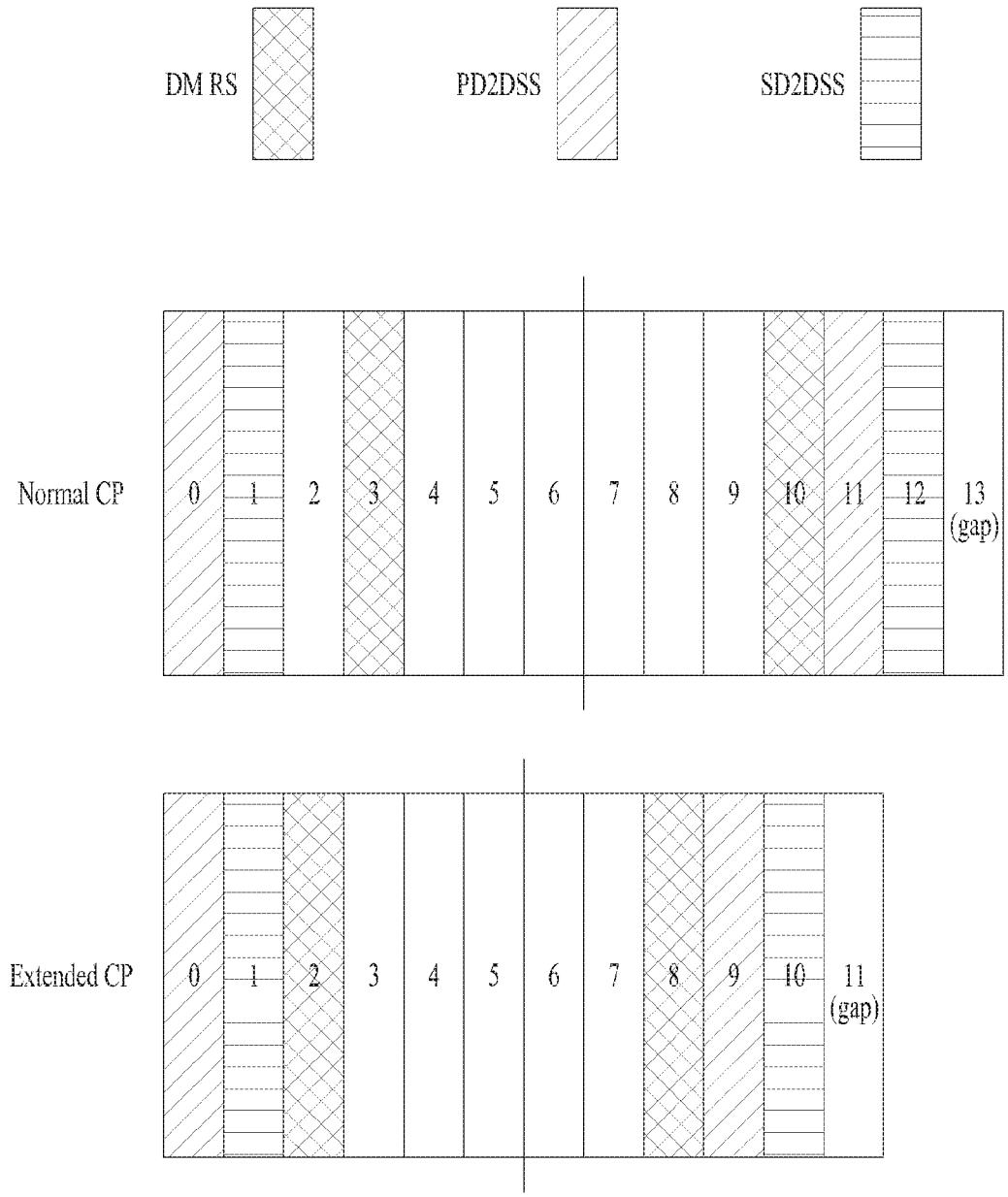

FIG. 20 is a diagram illustrating one embodiment according to the above-mentioned principles. Although it is assumed that a PD2DSS and an SD2DSS are sequentially transmitted in two adjacent D2DSS symbols, the SD2DSS can be first transmitted and then the PD2DSS can be transmitted by changing the order. Alternatively, the transmission order can be changed according to slots and thus it can be determined whether a slot in which a corresponding D2DSS is transmitted is an even-numbered slot or an odd-numbered slot. For instance, the PD2DSS may be transmitted before the SD2DSS in the even-numbered slot and the SD2DSS may be transmitted before the PD2DSS in the odd-numbered slot.

Alternatively, the same type of D2DSSs can be transmitted in consecutive symbols as described above. For instance, the PD2DSSs may be transmitted in two first-appearing consecutive symbols and the SD2DSSs may be transmitted in two later-appearing consecutive symbols. On the contrary, the SD2DSSs may be transmitted in the two first-appearing consecutive symbols and the PD2DSSs may be transmitted in the two later-appearing consecutive symbols.

Referring to FIG. 20, in the case of the normal CP, DM RSs are located at symbol #3 and symbol #10 within one subframe. The D2DSS can be designed to be located outside of the symbols #3 and #10 at which the DM RSs are located. That is, symbols #0, 1, 2, 11, 12, and 13 can be used for usage of the D2DSS. In FIG. 20, the PD2DSS is located at the symbol #0 of the first slot, the SD2DSS is located at the symbol #1 of the first slot, the PD2DSS is located at the symbol #11 of the second slot, and the SD2DSS is located at the symbol #12 of the second slot in order to locate the D2DSS at the outermost symbols. In this case, the symbol #13 is configured as a gap for a next subframe. In addition, the remaining symbols may be configured for other channels.

In the case of the extended CP, DM RSs are located at symbol #2 and symbol #8 within one subframe. The D2DSS can be designed to be located outside of the symbols #2 and #8 at which the DM RSs are located. That is, symbols #0, 1, 9, 10, and 11 can be used for usage of the D2DSS. Referring to FIG. 20, in the first slot, the PD2DSS is located at the symbol #0 and the SD2DSS is located at the symbol #1. And, in the second slot, the PD2DSS is located at the symbol #9 and the SD2DSS is located at the symbol #10. In this case, the symbol #11 is configured as a gap for a next subframe. In addition, the remaining symbols may be configured for other channels.

Embodiment 2-2

According to the embodiment 2-2, on the premise of the symbol locations at which the DM RSs are arranged according to the embodiment 2, it is possible to design the D2DSS location in consideration of AGC (automatic gain control) in some cases. The AGC can also be considered in other embodiments as well as the embodiment 2-2.

Figure 21:
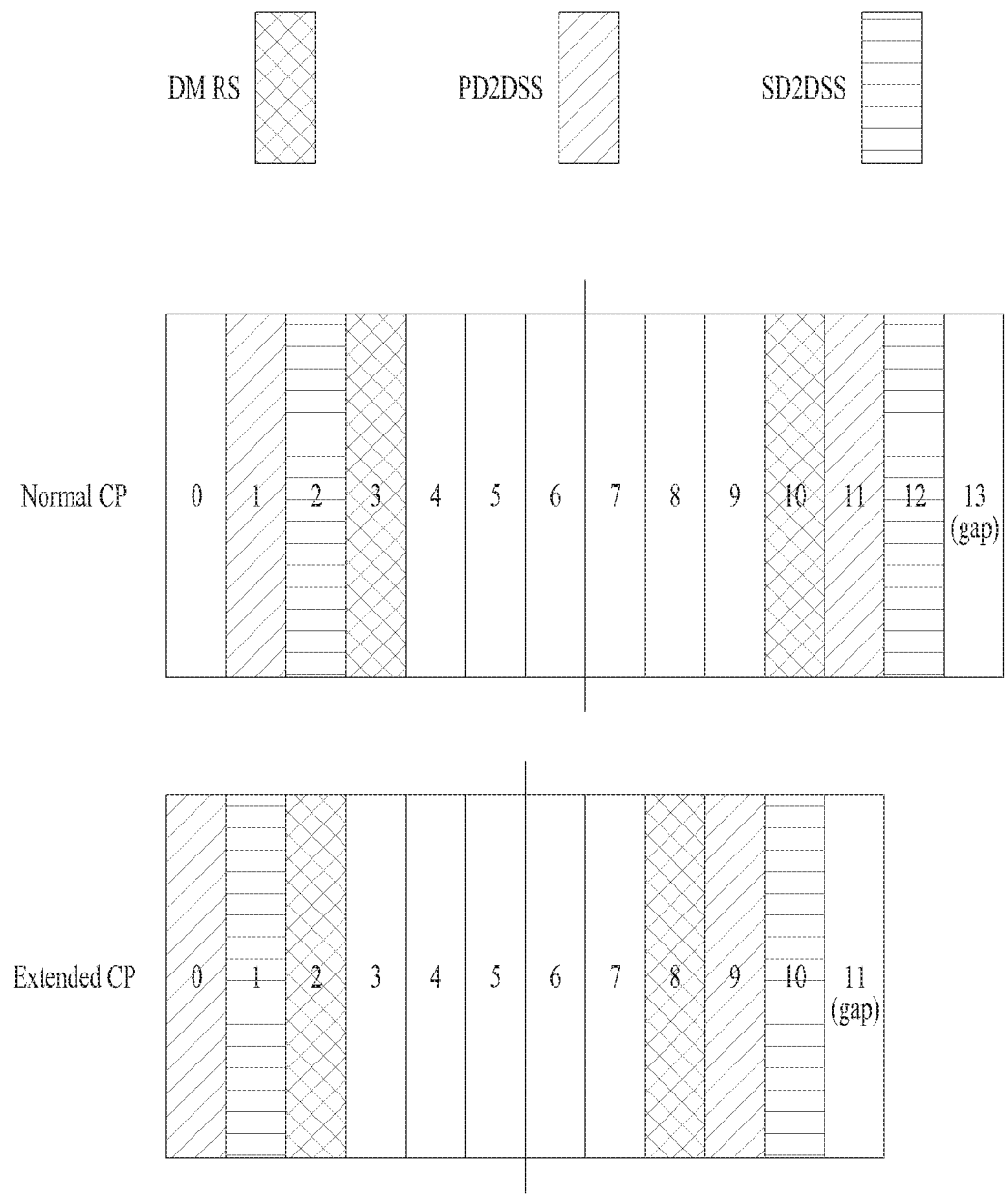

FIG. 21 is a diagram illustrating one embodiment according to the above-mentioned principles. Specifically, FIG. 21 shows a case in which the first symbol is not used for usage of the D2DSS in the case of the normal CP in FIG. 20. More specifically, FIG. 21 shows an embodiment of performing the AGC for a receiving UE on the starting point (symbol #1) of a corresponding subframe and providing a duration for detecting the D2DSS in the case of the normal CP.

Referring to FIG. 21, in the case of the normal CP, DM RSs are located at symbol #3 and symbol #10 within one subframe. The D2DSS can be designed to be located outside of the symbols #3 and #10 at which the DM RSs are located. That is, symbols #0, 1, 2, 11, 12, and 13 can be used for usage of the D2DSS. However, since the first symbol is configured for the AGC instead of the D2DSS, D2DSSs may be mapped to the second symbol (symbol #1) of the first slot, the third symbol (symbol #2) of the first slot, the fifth symbol (symbol #11) of the second slot, and the sixth symbol (symbol #12) of the second slot. Referring to FIG. 21, in the first slot, the PD2DSS is located at the symbol #1, and the SD2DSS is mapped to the symbol #2. And, in the second slot, the PD2DSS is located at the symbol #11 and the SD2DSS is mapped to the symbol #12. In this case, the symbol #13 is configured as a gap for a next subframe. In addition, the remaining symbols may be configured for other channels.

The first symbol (symbol #0) can be used for different usage, for example, a PD2DSCH. That is, after appropriately configuring the AGC by receiving a different signal in the first symbol rather than the D2DSS, a UE detects the D2DSS from a next symbol. Therefore, according to this embodiment, D2DSS detection stability can be improved.

In the case of the extended CP, DM RSs are located at symbol #2 and symbol #8 within one subframe. The D2DSS can be designed to be located outside of the symbols #2 and #8 at which the DM RSs are located. That is, symbols #0, 1, 9, 10, and 11 can be used for usage of the D2DSS. Here, whether the first symbol is configured for the AGC in the extended CP configuration needs to be discussed. This is because if the DM RS is located at the symbol #2 for the purpose of configuring the first symbol for the AGC instead of the D2DSS, it may cause the problem of which symbol locations are used for two D2DSS symbols.

According to FIG. 21, when the AGC collides with the D2DSS, it is proposed to give priority to the D2DSS. Thus, in the case of the extended CP, the D2DSSs are located at symbols #0 and #1 of the first slot in one subframe. That is, the D2DSSs may be mapped to the first symbol (symbol #0) and the second symbol (symbol #1) of the first slot in the subframe and the fourth symbol (symbol #9) and the fifth symbol (symbol #10) of the second slot in the subframe. In FIG. 21, in the first slot, the PD2DSS is located at the symbol #0 and the SD2DSS is located at the symbol #1. And, in the second slot, the PD2DSS is located at the symbol #9 and the SD2DSS is located at the symbol #10. In this case, the symbol #11 is configured as a gap for a next subframe. In addition, the remaining symbols may be configured for other channels.

Although it is also assumed in FIG. 21 that the PD2DSS and the SD2DSS are sequentially transmitted in two adjacent D2DSS symbols, the SD2DSS can be first transmitted and then the PD2DSS can be transmitted by changing the order. Alternatively, the transmission order can be changed according to slots and thus it can be determined whether a slot in which a corresponding D2DSS is transmitted is an even-numbered slot or an odd-numbered slot. For instance, the PD2DSS may be transmitted before the SD2DSS in the even-numbered slot and the SD2DSS may be transmitted before the PD2DSS in the odd-numbered slot.

Alternatively, the same type of D2DSSs can be transmitted in consecutive symbols as described above. Specifically, in the case of the normal CP, the PD2DSSs may be mapped to the symbols #1 and #2 and the SD2DSSs may be mapped to the symbols #10 and #11. In the case of the extended CP, the PD2DSSs may be mapped to the symbols #0 and #1 and the SD2DSSs may be mapped to the symbols #10 and #11. On the contrary, in the case of the normal CP, the SD2DSSs may be mapped to the symbols #1 and #2 and the PD2DSSs may be mapped to the symbols #10 and #11. In the case of the extended CP, the SD2DSS may be mapped to the symbols #0 and #1 and the PD2DSSs may be mapped to the symbols #9 and #10. However, preferably, the PD2DSS may be first mapped in consideration of usage of the PD2DSS and SD2DSS.

Embodiment 2-3

Figure 22:
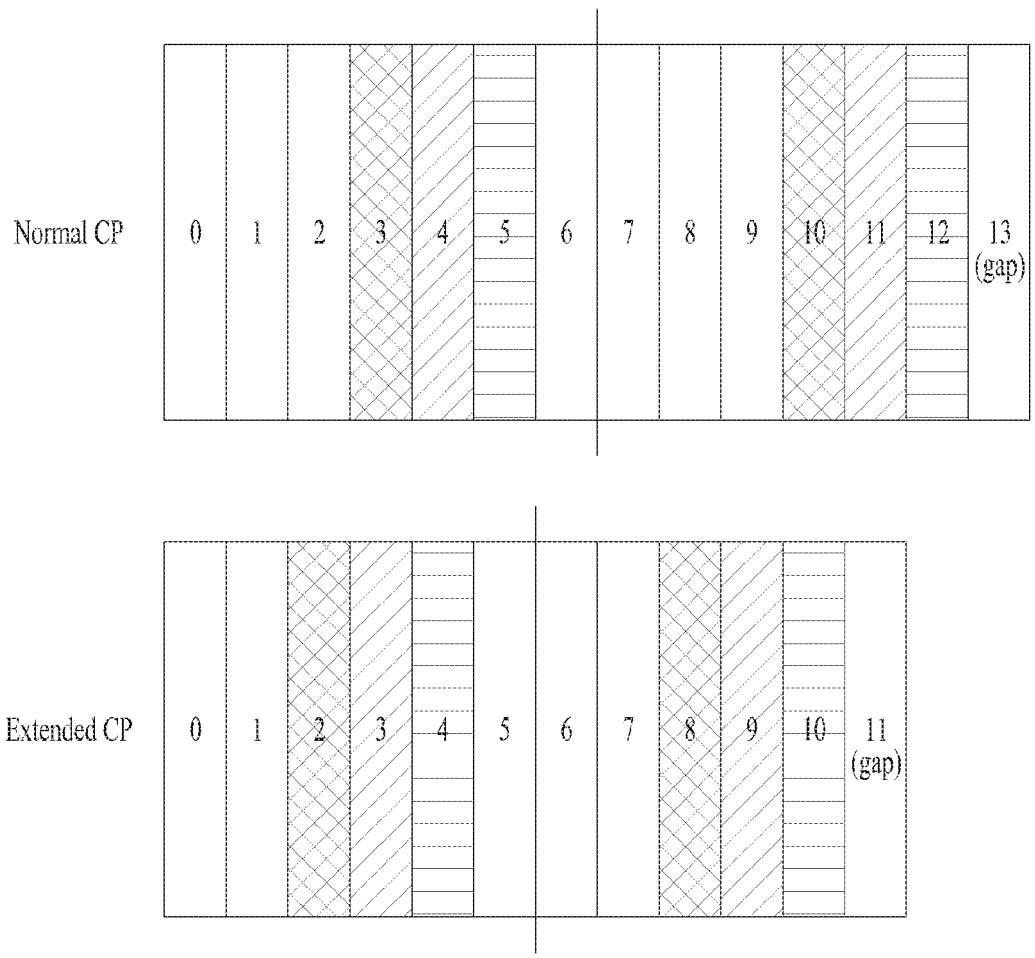

FIGS. 22 to 25 illustrate embodiments in which the first symbol is not used in both cases of the normal CP and the extended CP due to the aforementioned AGC-related problem. In particular, FIG. 22 illustrates a case in which the first symbol is used for the DM RS and a next symbol is used for usage of the D2DSS. Specifically, in the case of the extended CP, since two consecutive D2DSS symbols cannot be found before the first DM RS symbol if the first symbol is excluded, the first symbol is used for the DM RS and the next symbol is used for the D2DSS.

In detail, in the case of the normal CP, DM RSs are located at symbol #3 and symbol #10 within one subframe. In the first slot, the PD2DSS is located at symbol #4 and the SD2DSS is located at symbol #5. In the second slot, the PD2DSS is located at symbol #11 and the SD2DSS is located at symbol #12. In this case, symbol #13 may be configured as a gap for a next subframe. In addition, the remaining symbols may be configured for other channels.

In the case of the extended CP, DM RSs are located at symbol #2 and symbol #8 within one subframe. The D2DSS can be designed to be located next to the symbols #2 and #8 at which the DM RSs are located. In the first slot, the PD2DSS is located at symbol #3 and the SD2DSS is located at symbol #4. In the second slot, the PD2DSS is located at symbol #9 and the SD2DSS is located at symbol #10. In this case, symbol #11 may be configured as a gap for a next subframe. In addition, the remaining symbols may be configured for other channels.

Especially, according to the structure illustrated in FIG. 22, since the locations of the DM RS and D2DSS are identical in each slot, it has advantages of applying the same channel estimation method.

Embodiment 2-4

Figure 23:
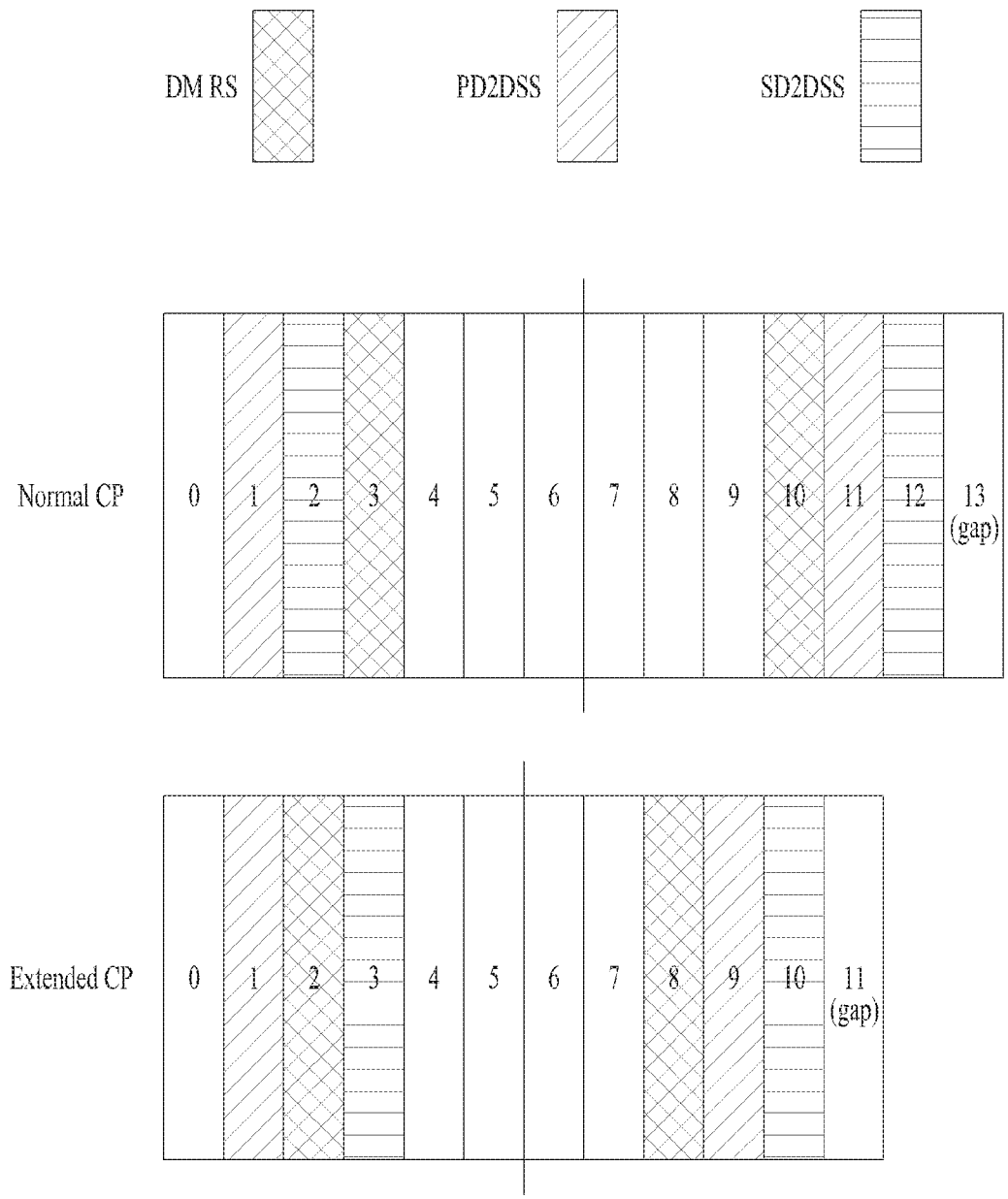

FIG. 23 illustrates an embodiment of locating a D2DSS around a DM RS in the case of the extended CP. Specifically, in case that the AGC-related problem occurs in the first symbol, if one D2DSS moves in the case of the extended CP, it may collide with the DM RS. In this case, the collision can be avoided by locating the D2DSS around the DM RS. It is possible to design arrangement in the first slot different from that in the second slot. In detail, in the case of the extended CP, D2DSSs may be designed to be located at symbols #1 and #3 of the first slot in a subframe by considering symbol #2 at which the DM RS is located. Thus, in the first slot, the PD2DSS is located at the symbol #1 and the SD2DSS is located at the symbol #3. And, in the second slot, the PD2DSS is located at symbol #9 and the SD2DSS is located at symbol #10. Symbol #11 may be configured as a gap for a next subframe. In addition, the remaining symbols may be configured for other channels.

Embodiment 2-5

Figure 24:
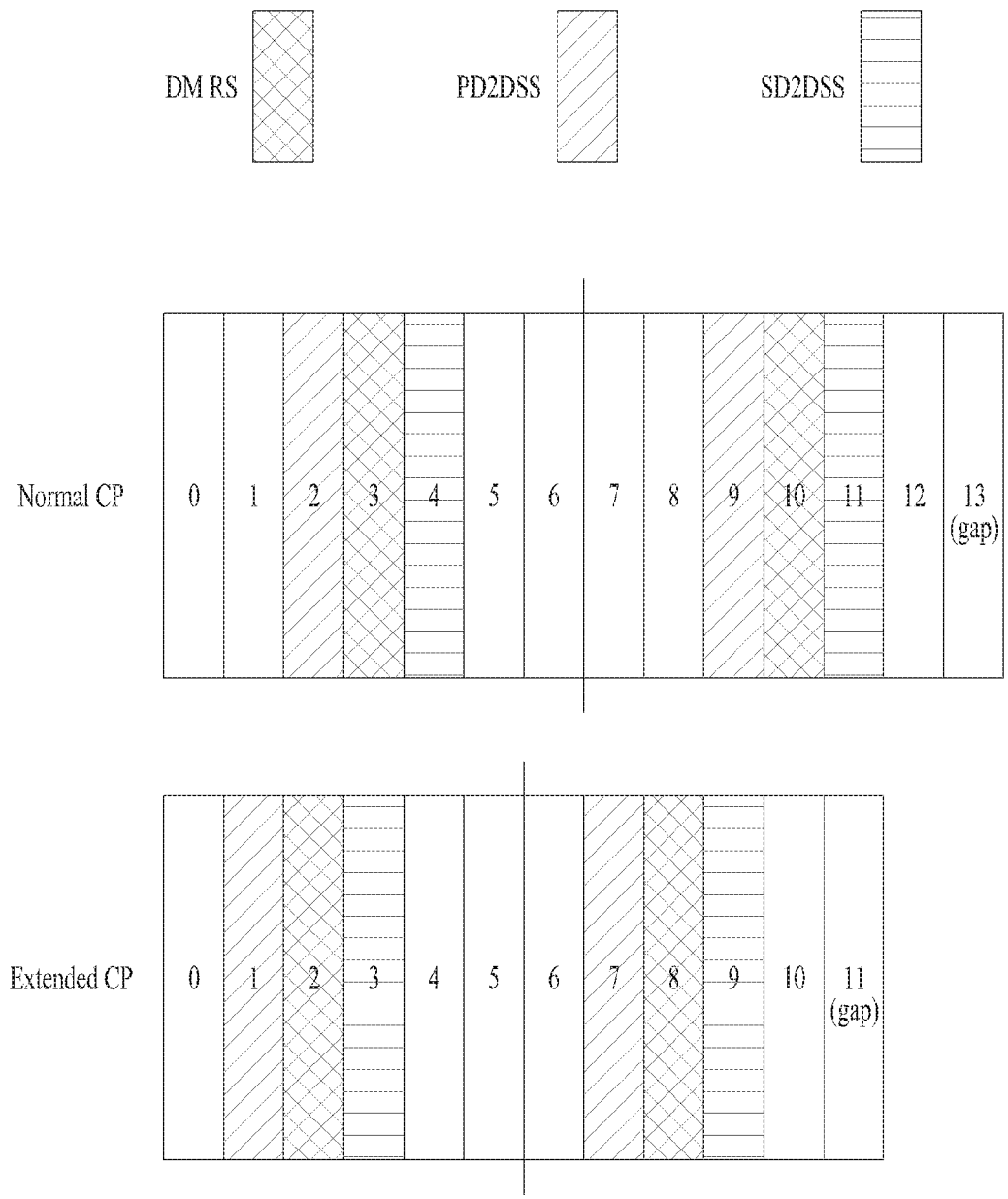

FIG. 24 shows an example obtained by modifying the example of FIG. 23 for both cases of the normal CP and the extended CP. In FIG. 23, in the case of the extended CP, two D2DSS symbols are separated from each other by one symbol. In FIG. 24, two adjacent D2DSS symbols are configured to be separated from each other by one-symbol gap at all times in a manner of extensively applying the separation of FIG. 23 to all D2DSS symbols. In this case, a relationship between the two adjacent D2DSS symbols can be maintained constantly irrespective of CP lengths or slot locations. Particularly, according to the above property, since the same scheme can be commonly applied to various CP lengths or slots when a channel estimation value obtained from one D2DSS symbol is utilized for another D2DSS symbol, UE implementation can be simplified.

In detail, in the case of the normal CP, in the first slot of a subframe, the PD2DSS is located at symbol #2 and the SD2DSS is located at symbol #4. And, in the second slot, the PD2DSS is located at symbol #9 and the SD2DSS is located at symbol #11. In this case, symbol #13 may be configured as a gap for a next subframe. In addition, the remaining symbols may be configured for other channels.

In the case of the extended CP, in the first slot of a subframe, the PD2DSS is located at symbol #1 and the SD2DSS is located at symbol #3. And, in the second slot, the PD2DSS is located at symbol #7 and the SD2DSS is located at symbol #9. In this case, symbol #11 may be configured as a gap for a next subframe. In addition, the remaining symbols may be configured for other channels.

Embodiment 2-6

Figure 25:
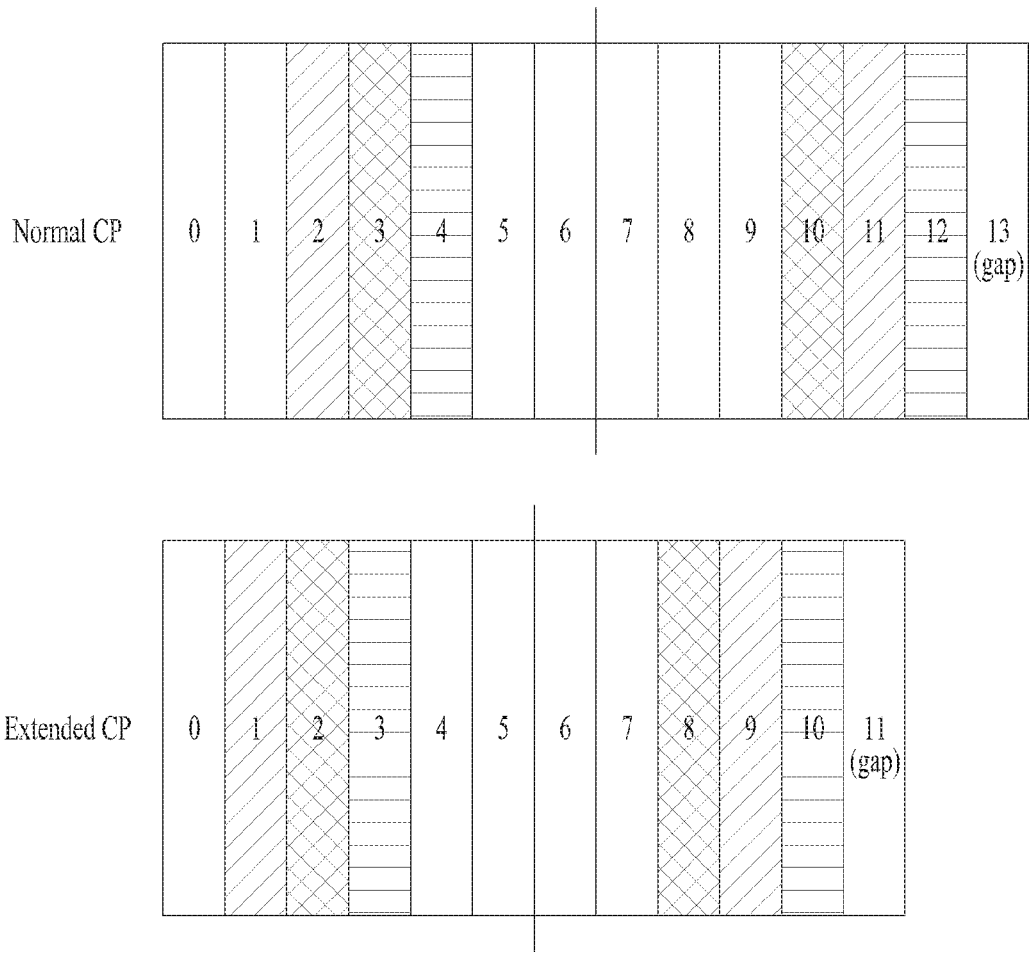

FIG. 25 shows another example obtained by modifying the example of FIG. 23. Referring to FIG. 25, a distance between two adjacent D2DSS symbols is changed according to slot locations. According to this modified example, it has disadvantages in that a UE considers a D2DSS symbol relationship changed according to the slot locations. However, since an index of the slot in which a specific D2DSS is located can be obtained from only the distance between the D2DSS symbols, it is beneficial to later D2DSS processing and subframe index acquisition.

In detail, in the case of the normal CP, in the first slot of a subframe, the PD2DSS is located at symbol #2 and the SD2DSS is located at symbol #4. And, in the second slot, the PD2DSS is located at symbol #11 and the SD2DSS is located at symbol #12. In this case, symbol #13 may be configured as a gap for a next subframe. In addition, the remaining symbols may be configured for other channels.

In the case of the extended CP, in the first slot of a subframe, the PD2DSS is located at symbol #1 and the SD2DSS is located at symbol #3. And, in the second slot, the PD2DSS is located at symbol #9 and the SD2DSS is located at symbol #10. In this case, symbol #11 may be configured as a gap for a next subframe. In addition, the remaining symbols may be configured for other channels.

The principles described with reference to FIGS. 23 to 25 can also be applied to a normal case, i.e., a case in which one symbol, which is not the D2DSS symbol, is located between two D2DSS symbols. In this case, the one symbol that is not the D2DSS symbol may not necessarily be a DM RS.

Similarly, it is also assumed that the PD2DSS and the SD2DSS are sequentially transmitted in two adjacent D2DSS symbols, the SD2DSS can be first transmitted and then the PD2DSS can be transmitted by changing the order. Alternatively, the transmission order can be changed according to slots and thus it can be determined whether a slot in which a corresponding D2DSS is transmitted is an even-numbered slot or an odd-numbered slot. For instance, the PD2DSS may be transmitted before the SD2DSS in the even-numbered slot and the SD2DSS may be transmitted before the PD2DSS in the odd-numbered slot.

Embodiment 2-7

FIG. 25 shows another example obtained by modifying the example of FIG. 23. Specifically, FIG. 25 shows a case in which when a DM RS collides with a D2DSS in the first slot in the case of the extended CP, a location of the DM RS is changed instead of that of the D2DSS. In this case, similar to the normal CP, two D2DSS symbols can be always located adjacent to each other.

In detail, referring to FIG. 26, the DM RS and the D2DSS do not collide with each other in the case of the normal CP. Thus, in the first slot of a subframe, the PD2DSS is located at symbol #1 and the SD2DSS is located at symbol #2. And, in the second slot, the PD2DSS is located at symbol #11 and the SD2DSS is located at symbol #12. In this case, symbol #13 may be configured as a gap for a next subframe. In addition, the remaining symbols may be configured for other channels.

In the case of the extended CP, since the DM RS and the D2DSS collide with each other, the location of the DM RS can be changed. As shown in FIG. 26, DM RSs can be located at symbols #3 and #8. In this case, in the first slot of a subframe, the PD2DSS is located at symbol #1 and the SD2DSS is located at symbol #2. And, in the second slot, the PD2DSS is located at symbol #9 and the SD2DSS is located at symbol #10. In this case, symbol #11 may be configured as a gap for a next subframe. In addition, the remaining symbols may be configured for other channels.

Figure 30:
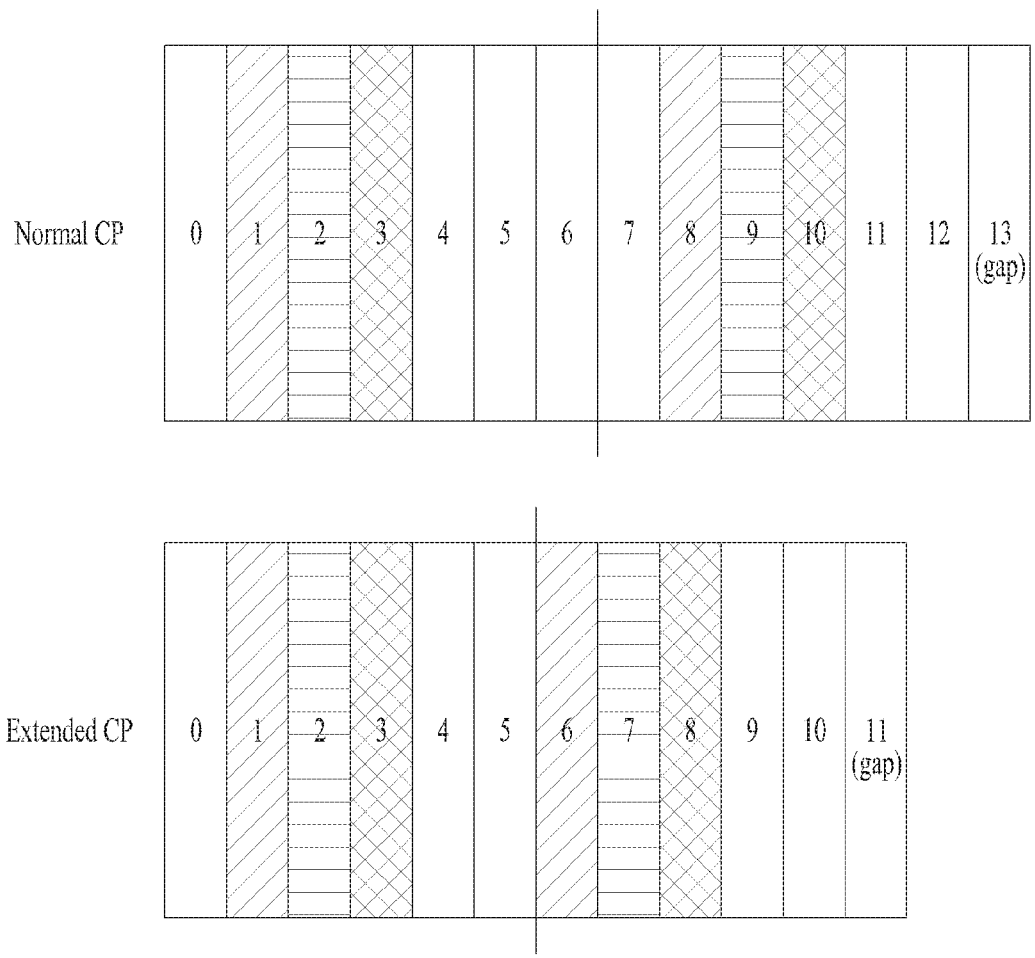

The aforementioned method of moving the DM RS when the D2DSS collides with the DM RS can also be applied to other embodiments and FIG. 30 shows an example of moving the DM RS.

Embodiment 2-8

Figure 27:
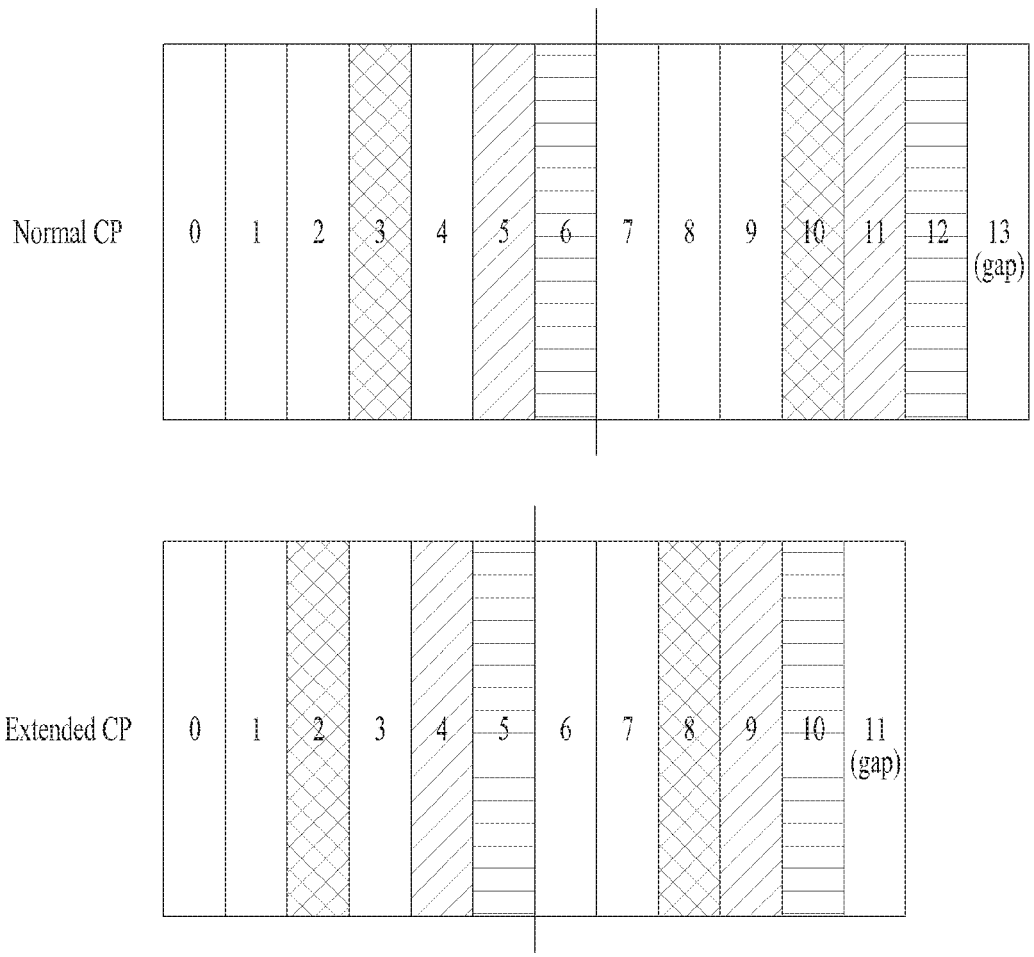

FIG. 27 shows an example obtained by modifying the example of FIG. 22. Specifically, FIG. 27 shows an embodiment designed to improve channel estimation performance by using symbols adjacent to a DM RS for signals except a D2DSS as many as possible. As a result, D2DSSs are located at the last two symbols of the first slot.

In detail, referring to FIG. 27, in the case of the normal CP, in the first slot of a subframe, the PD2DSS is located at symbol #5 and the SD2DSS is located at symbol #6. And, in the second slot, the PD2DSS is located at symbol #11 and the SD2DSS is located at symbol #12. In this case, symbol #13 may be configured as a gap for a next subframe. In addition, the remaining symbols may be configured for other channels.

In the case of the extended CP, in the first slot of a subframe, the PD2DSS is located at symbol #4 and the SD2DSS is located at symbol #5. And, in the second slot, the PD2DSS is located at symbol #9 and the SD2DSS is located at symbol #10. In this case, symbol #11 may be configured as a gap for a next subframe. In addition, the remaining symbols may be configured for other channels.

Embodiment 2-9 and Embodiment 2-10

Figure 28:
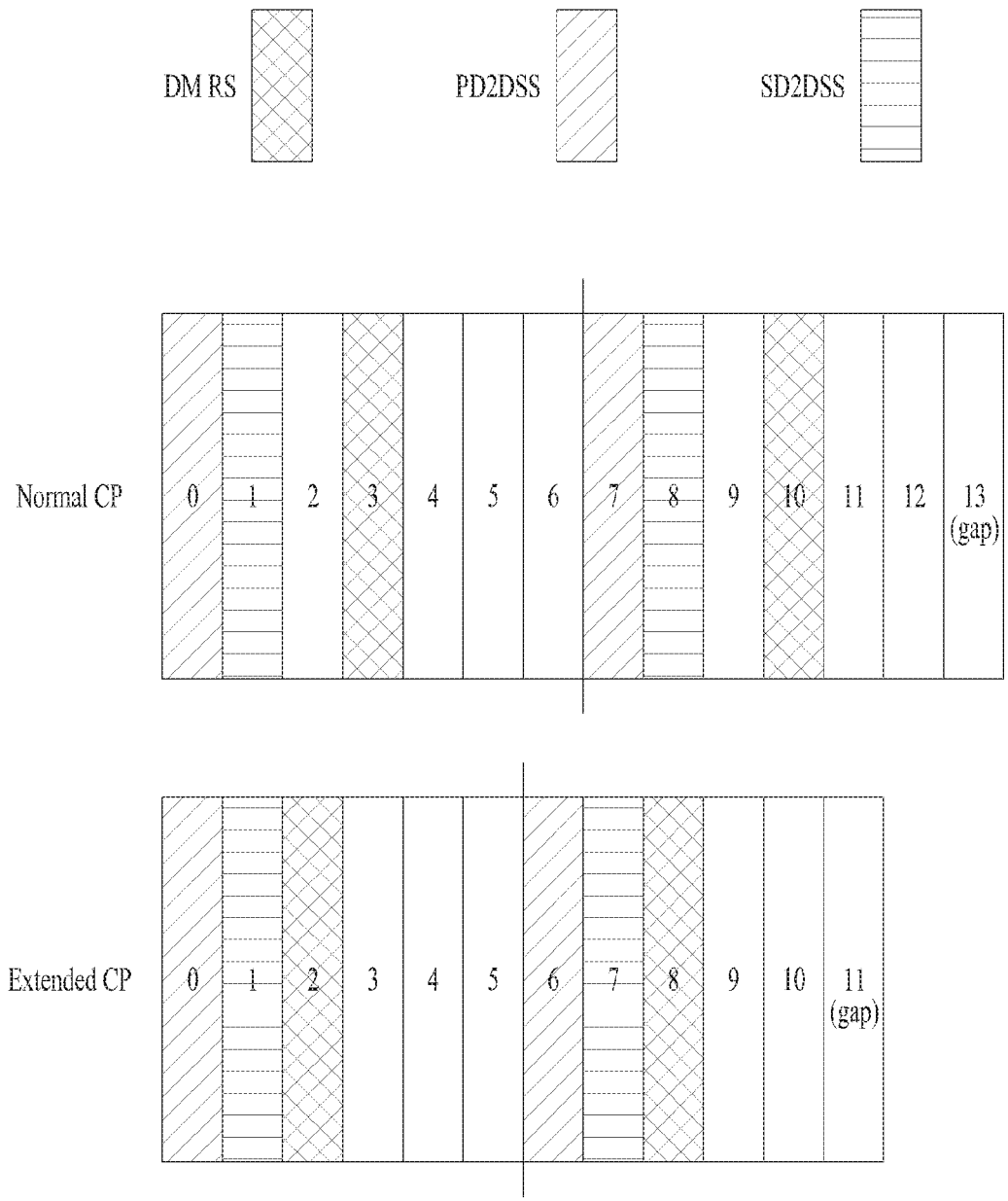
Figure 29:
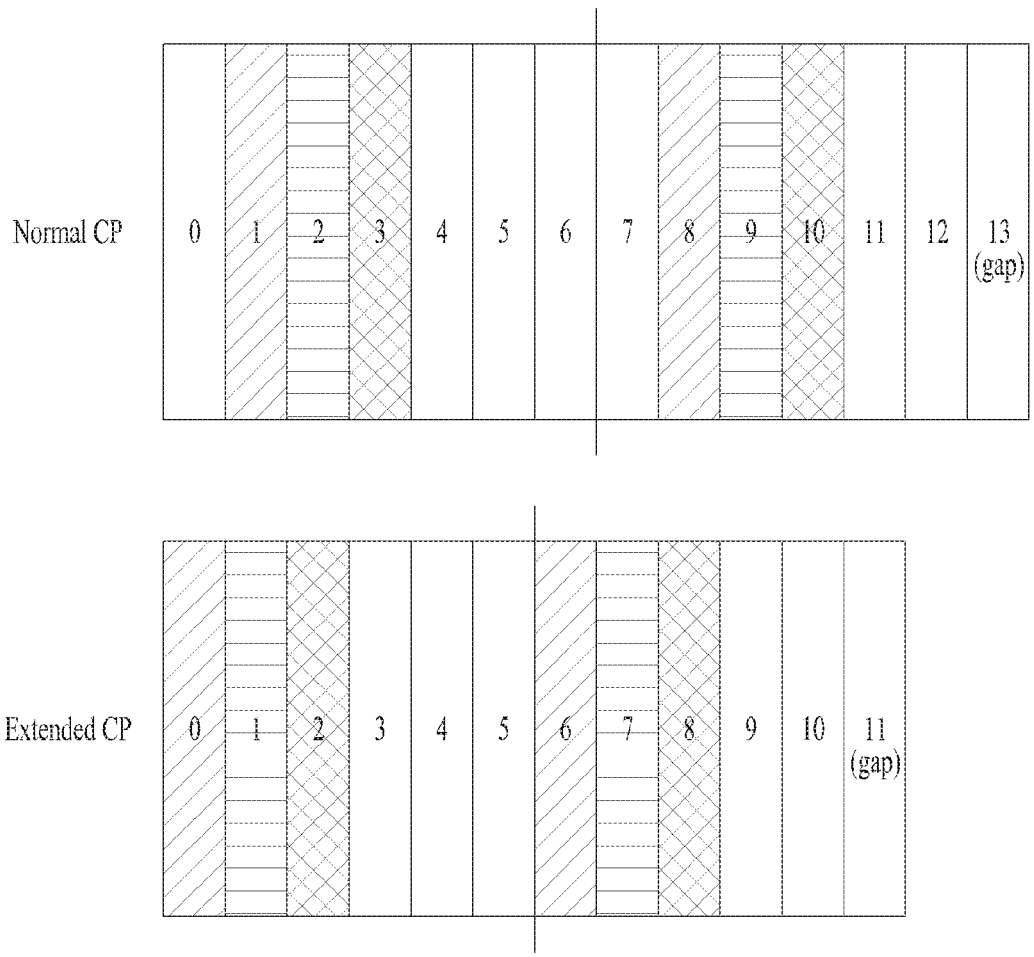

FIG. 28 shows an embodiment for maintaining the same RS and D2DSS arrangement structure in two slots as the embodiment of FIG. 20. FIG. 29 shows an embodiment for maintaining the same RS and D2DSS arrangement structure in two slots as the embodiment of FIG. 21. Specifically, a D2DSS location in the second slot is identical to that in the first slot. That is, FIG. 28 shows that the D2DSS is designed to be located outside of the RS in the first slot, and FIG. 29 shows that the D2DSS is designed not only to be located outside of the RS but also to consider AGC of the first symbol in the case of the normal CP. In addition, in both FIG. 28 and FIG. 29, the second slot has the same signal structure as the first slot.

In detail, referring to FIG. 28, in the case of the normal CP, in the first slot of a subframe, the PD2DSS is located at symbol #0 and the SD2DSS is located at symbol #1. And, in the second slot, the PD2DSS is located at symbol #7 and the SD2DSS is located at symbol #8. In this case, symbol #13 may be configured as a gap for a next subframe. In addition, the remaining symbols may be configured for other channels.

In the case of the extended CP, in the first slot of a subframe, the PD2DSS is located at symbol #0 and the SD2DSS is located at symbol #1. And, in the second slot, the PD2DSS is located at symbol #6 and the SD2DSS is located at symbol #7. In this case, symbol #11 may be configured as a gap for a next subframe. In addition, the remaining symbols may be configured for other channels.

Referring to FIG. 29, in the case of the normal CP, in the first slot of a subframe, the PD2DSS is located at symbol #0 and the SD2DSS is located at symbol #1. And, in the second slot, the PD2DSS is located at symbol #8 and the SD2DSS is located at symbol #9. In both of the first and second slots, D2DSSs are located at the second and third symbols. In this case, symbol #13 may be configured as a gap for a next subframe. In addition, the remaining symbols may be configured for other channels.

In the case of the extended CP, in the first slot of a subframe, the PD2DSS is located at symbol #0 and the SD2DSS is located at symbol #1. And, in the second slot, the PD2DSS is located at symbol #6 and the SD2DSS is located at symbol #7. In this case, symbol #11 may be configured as a gap for a next subframe. In addition, the remaining symbols may be configured for other channels.

Embodiment 2-11

FIG. 30 shows an embodiment obtained by applying the principle of FIG. 26 to the extended CP of FIG. 29. That is, in the first slot, symbol #0 is used for other usage rather than a D2DSS for the purpose of the AGC. As a result, D2DSS symbols are moved to symbols #1 and #2 and a DM RS, which collides with the D2DSS symbols, is moved to symbol #3 again.

In detail, in the case of the extended CP, in the first slot of a subframe, the PD2DSS is located at symbol #1 and the SD2DSS is located at symbol #2. And, in the second slot, the PD2DSS is located at symbol #6 and the SD2DSS is located at symbol #7. In this case, symbol #11 may be configured as a gap for a next subframe. In addition, the remaining symbols may be configured for other channels.

Embodiment 3

Figure 31:
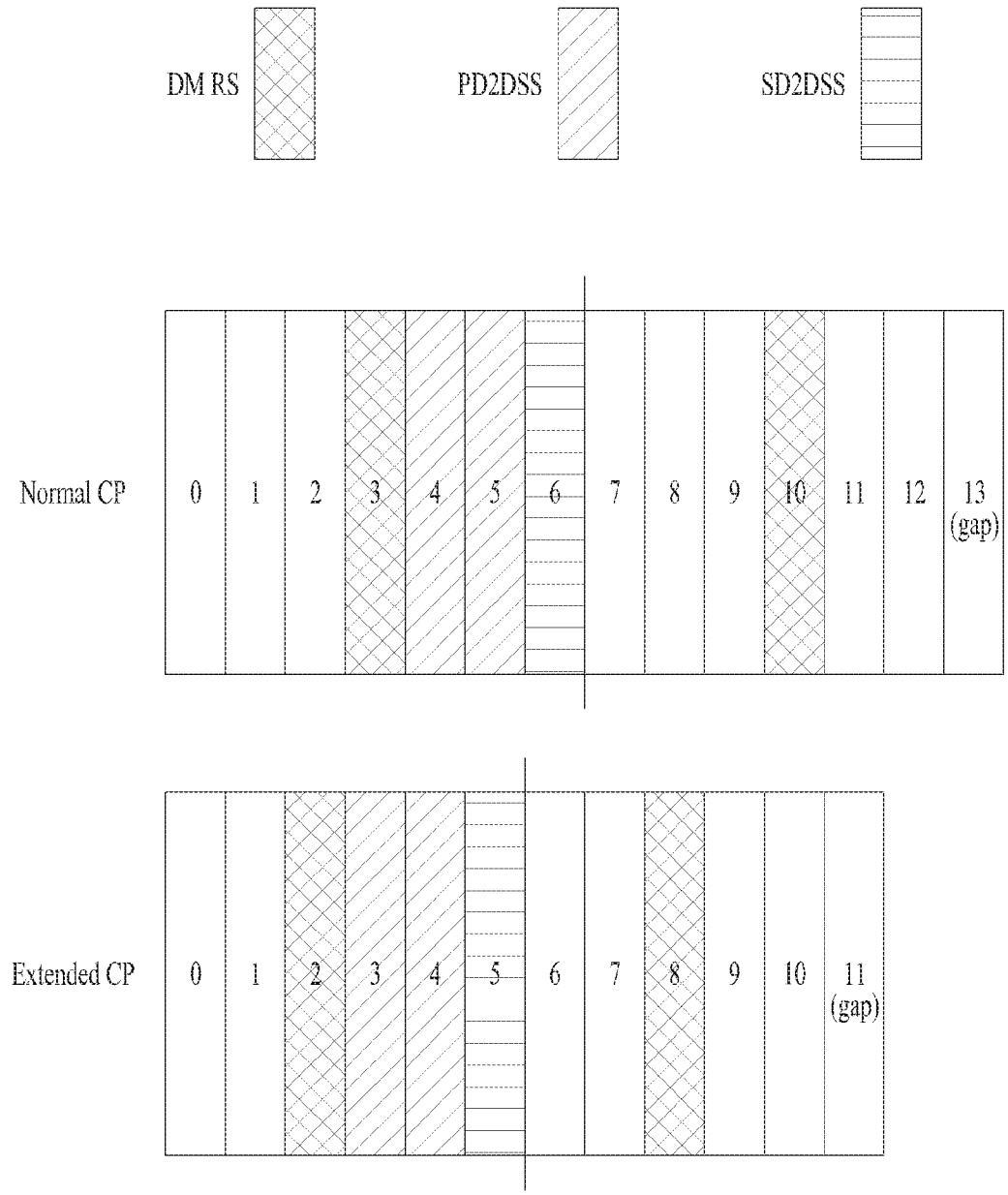

FIG. 31 shows a case in which two symbols are used for a PD2DSS and one symbol is used for an SD2DSS. In this case, three consecutive symbols can be preferably utilized for a D2DSS. In particular, in the case of the extended CP, a method of allocating three consecutive symbols for the D2DSS in one slot in a state in which a DM RS is maintained is only use of symbol #3, #4 and #5 and the same principle can also be applied to the normal CP. That is, in the case of the normal CP, symbols #4, #5, and #6 can be allocated for the D2DSS.

Although it is assumed in FIG. 31 that the SD2DSS is transmitted in one symbol appearing after two symbols used for PD2DSS transmission, the order of arranging the D2DSSs at the three symbols can be changed. For instance, after the SD2DSS transmission, the PD2DSSs may be transmitted in the two remaining symbols. Alternatively, the PD2DSSs can be located in the front and back of the SD2DSS. In particular, the latter structure may be efficient when channel estimation of the SD2DSS is performed through sequence detection of the PD2DSS and then sequence detection of the SD2DSS is performed.

Similarly, FIGS. 32 and 33 shows cases in which two symbols are used for a PD2DSS and one symbol is used for an SD2DSS. Similar to FIG. 31, three consecutive symbols can also be used for the D2DSS in FIGS. 32 and 33. However, FIGS. 32 and 33 shows a method of allocating the three consecutive symbols for the D2DSS across two slots in the state in which the DM RS is maintained. Referring to FIG. 32, in the case of the normal CP, symbols #5, #6, and #7 are allocated for the D2DSS and in the case of the extended CP, symbols #4, #5, and #6 are allocated for the D2DSS.

Referring to FIG. 33, in the case of the normal CP, symbols #6, #7, and #8 are allocated for the D2DSS and in the case of the extended CP, symbols #5, #6, and #7 are allocated for the D2DSS.

In the above description with reference FIGS. 31 to 33, it is assumed that the SD2DSS is transmitted in one symbol appearing after two symbols used for the PD2DSS transmission. However, the order of arranging the D2DSSs at the three symbols can be changed. For instance, after the SD2DSS transmission, the PD2DSSs may be transmitted in the two remaining symbols. Alternatively, the PD2DSSs can be located in the front and back of the SD2DSS. In particular, the latter structure may be efficient when channel estimation of the SD2DSS is performed through sequence detection of the PD2DSS and then sequence detection of the SD2DSS is performed Embodiment 4

In the embodiment 4, additional embodiments of the D2DSS pattern will be described.

Meanwhile, the PD2DSCH can be demodulated from the D2DSS. For this operation, a UE for transmitting the PD2DSCH transmits the D2DSS in the same frame at all times. By doing so, an extra DM RS for the PD2DSCH is not required and thus more symbols can be used for the PD2DSCH.

In addition, only the SD2DSS can be used for PD2DSCH demodulation. In general, since a D2DSS receiving UE attempts to detect the PD2DSS for all available times, the UE may maintain a small number of PD2DSS sequence sets to reduce complexity in the PD2DSS detection. Thus, two UEs having different PD2DSCH contents are highly likely to transmit the same PD2DSS sequence. In this case, the PD2DSCH cannot be demodulated based on the PD2DSS. However, since the D2DSS receiving UE attempts to detect the SD2DSS for the time obtained through the PD2DSS, the UE may use a larger number of sequence sets. Thus, in this case, different UEs are highly likely to use different sequences.

In this case, preferably, the SD2DSS can be arranged at a location of the DM RS in order to maintain channel estimation for the conventional PUSCH DM RS. The location of the D2DSS is illustrated in FIGS. 34 to 37.

Figure 34:
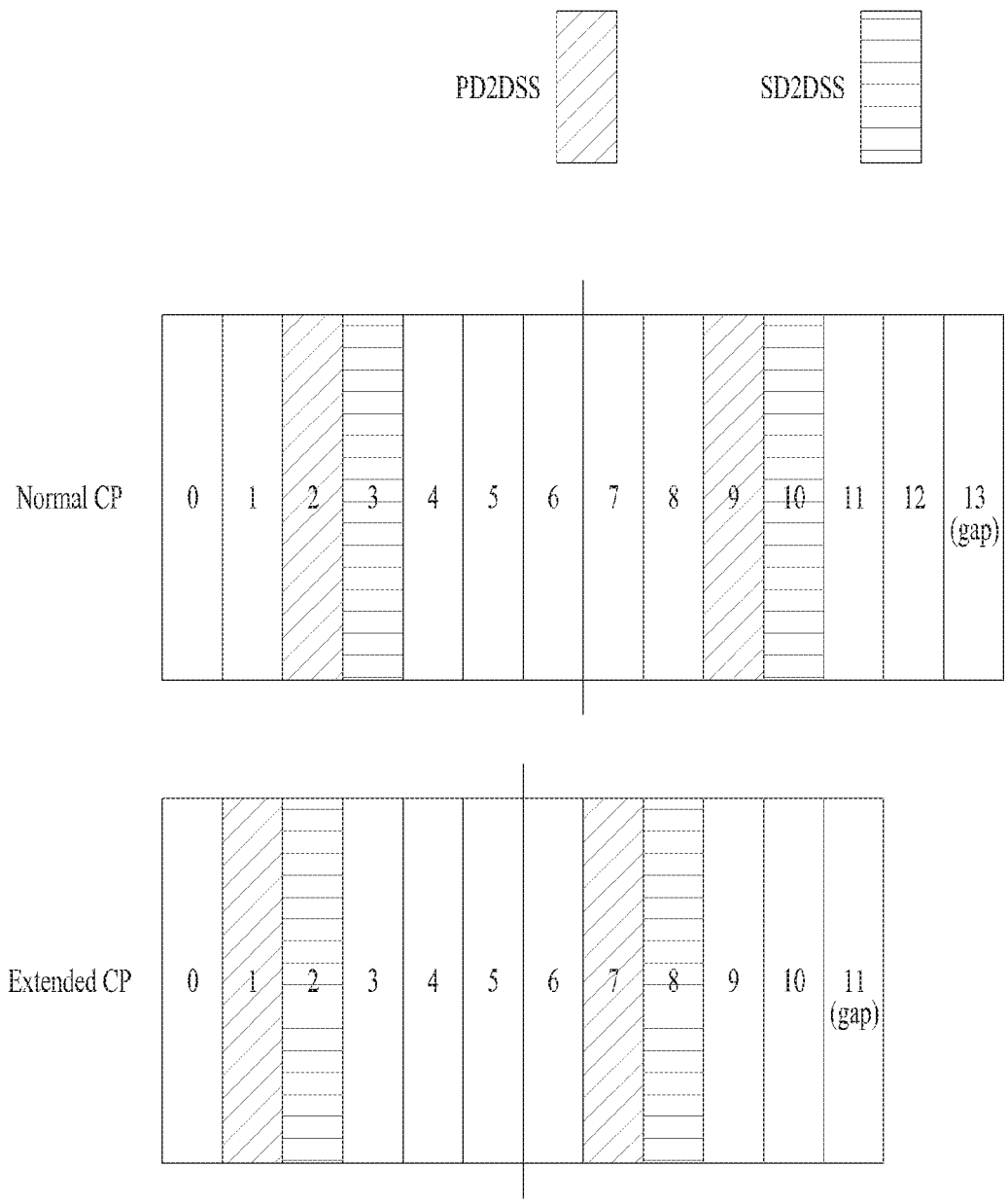
FIGS. 34 to 37 illustrate embodiments in which D2DSS symbols are arranged within one subframe when the D2DSS symbols are used for demodulation.
Figure 35:
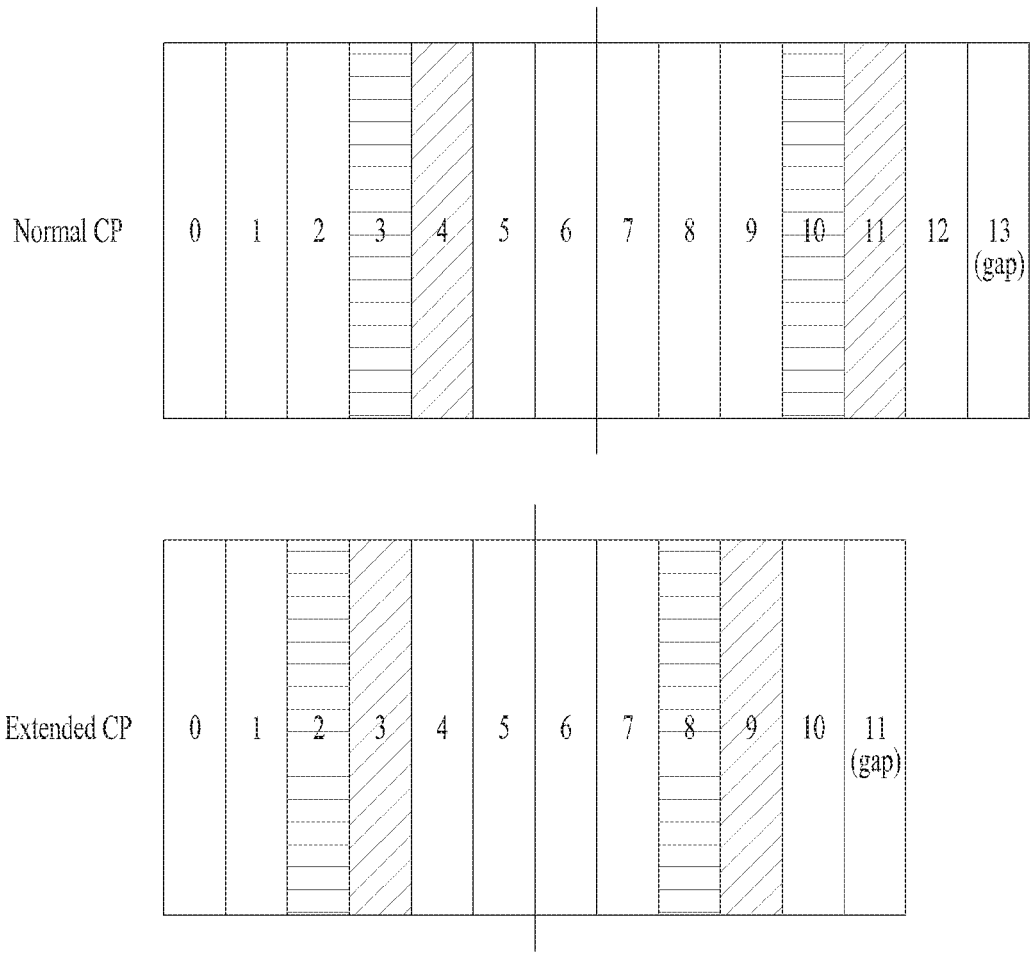

Referring to FIGS. 34 and 35, since each of the PD2DSS and the SD2DSS has the same structure in two slots, uncertainty about the SD2DSS detection location can be eliminated after the PD2DSS detection. In this case, it can be determined whether each SD2DSS is for the first slot or the second slot by setting SD2DSS sequence used in the two slots different from each other.

Figure 36:
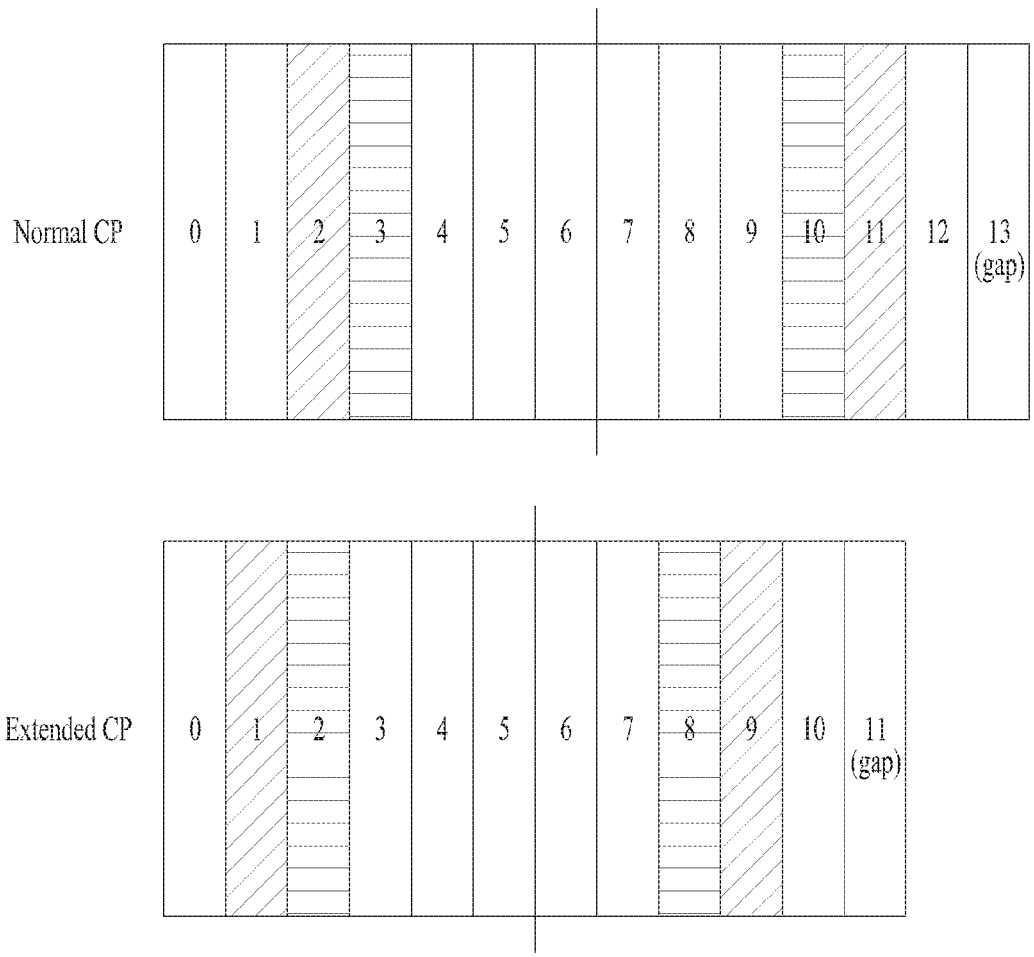
Figure 37:
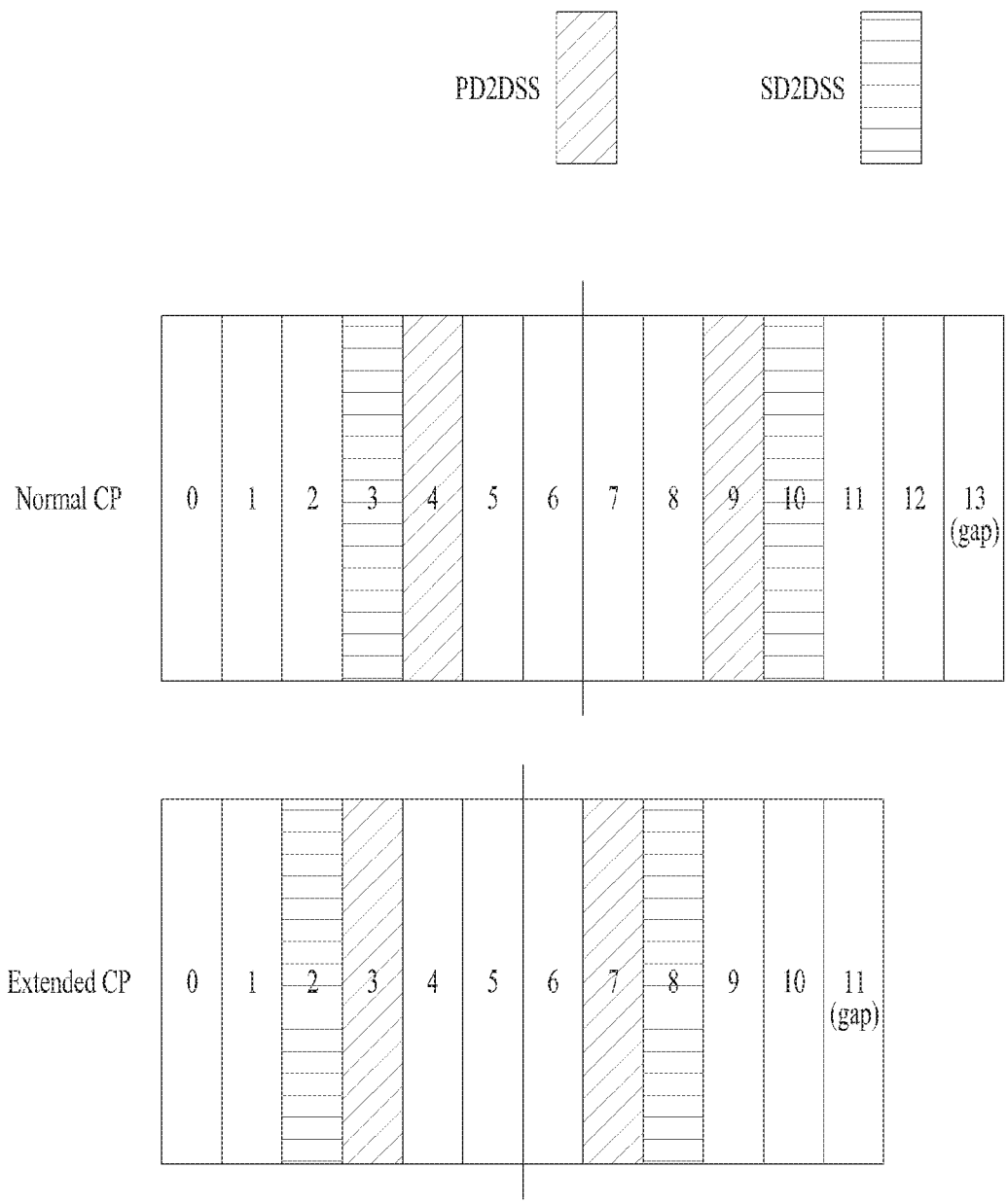

Referring to FIGS. 36 and 37, each of the PD2DSS and the SD2DSS has different structures in two slots. Thus, even if two SD2DSS has the same sequence, it can be determined whether each SD2DSS is for the first slot or the second slot. According to the structure of FIG. 36, the number of PD2DSCH symbols located between SD2DSSs used for demodulation is maximized. Thus, it has advantages of maximizing PD2DSCH demodulation performance. In all of four cases, the PD2DSS and the SD2DSS are allocated to adjacent symbols. This configuration is advantageous for estimating a high frequency error component through channel variation between the PD2DSS and the SD2DSS.

Figure 38:
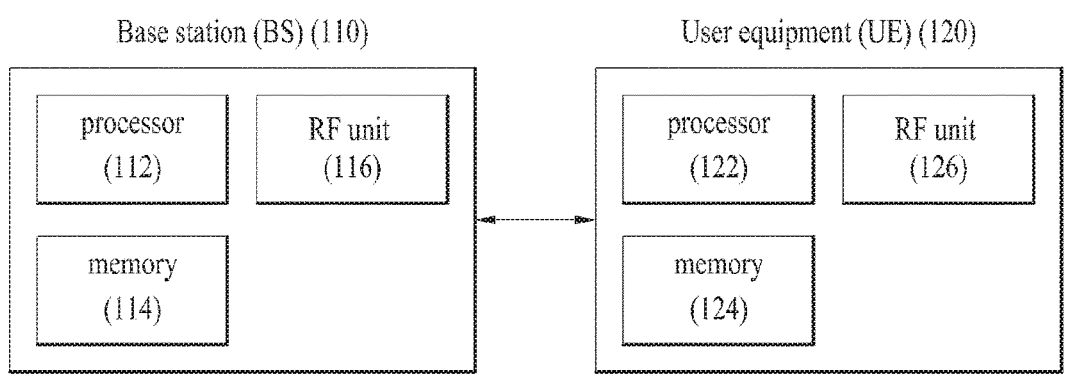
FIG. 38 illustrates examples of a base station and a user equipment applicable to embodiments of the present invention.

FIG. 38 illustrates a BS and a UE applicable to an embodiment of the present invention. In a system including a relay, the BS and the UE may be replaced with the relay.

Referring to FIG. 38, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas. The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for transmitting and receiving synchronization signals for direct communication between terminals in a wireless communication system and apparatus therefor are described with reference to examples applied to the 3GPP LTE system, it can be applied to various kinds of wireless communication systems as well as the 3GPP LTE system.

What is claimed is:

1. A method of transmitting a synchronization signal for a Device-to-Device (D2D) link in a wireless communication system, the method performed by a User Equipment (UE) and comprising:
    transmitting a primary synchronization signal for the D2D link (PD2DSS) at two consecutive Single Carrier-Frequency Division Multiple Access (SC-FDMA) symbols in a first slot of a subframe; and
    transmitting a secondary synchronization signal for the D2D link (SD2DSS) at two consecutive SC-FDMA symbols in a second slot of the subframe,
    wherein the two consecutive SC-FDMA symbols in the first slot are located apart from the two consecutive SC-FDMA symbols in the second slot, and
    wherein demodulation reference signals (DMRSs) are mapped to two SC-FDMA symbols in the subframe, each of the two SC-FDMA symbols consecutive to each of the two consecutive SC-FDMA symbols in the first slot and the two consecutive SC-FDMA symbols in the second slot.

2. The method of claim 1, wherein when each of SC-FDMA symbols of the subframe includes a normal cyclic prefix, the PD2DSS is mapped to a second SC-FDMA symbol and a third SC-FDMA symbol in the first slot of the subframe, and the SD2DSS is mapped to a fifth SC-FDMA symbol and a sixth SC-FDMA symbol in the second slot of the subframe.

3. The method of claim 1, wherein when each of the SC-FDMA symbols of the subframe includes an extended cyclic prefix, the PD2DSS is mapped to a first SC-FDMA symbol and a second SC-FDMA symbol in the first slot of the subframe, and the SD2DSS is mapped to a fourth SC-FDMA symbol and a fifth SC-FDMA symbol in the second slot of the subframe.

4. The method of claim 1, wherein a last SC-FDMA symbol of the subframe is configured as a gap.

5. The method of claim 2, wherein the DMRSs are mapped to a fourth SC-FDMA symbol of the first slot and a fourth SC-FDMA symbol of the second slot.

6. The method of claim 3, wherein the DMRSs are mapped to a third SC-FDMA symbol of the first slot and a third SC-FDMA symbol of the second slot.

7. A User Equipment (UE) for transmitting synchronization signal for a Device-to-Device (D2D) link in a wireless communication system, the UE comprising:
    a Radio Frequency (RF) module configured to transmit and receive signals; and
    a processor operably coupled with the RF module and configured to:
    control the RF module to transmit a primary synchronization signal for the D2D link (PD2DSS) at two consecutive Single Carrier-Frequency Division Multiple Access (SC-FDMA) symbols in a first slot of a subframe; and
    control the RF module to transmit a secondary synchronization signal for the D2D link (SD2DSS) at two consecutive SC-FDMA symbols in a second slot of the subframe,
    wherein the two consecutive SC-FDMA symbols in the first slot are located apart from the two consecutive SC-FDMA symbols in the second slot, and wherein demodulation reference signals (DMRSs) are mapped to two SC-FDMA symbols in the subframe, each of the two SC-FDMA symbols consecutive to each of the two consecutive SC-FDMA symbols in the first slot and the two consecutive SC-FDMA symbols in the second slot.

8. The UE of claim 7, wherein when each of SC-FDMA symbols of the subframe includes a normal cyclic prefix, the PD2DSS is mapped to a second SC-FDMA symbol and a third SC-FDMA symbol in the first slot of the subframe, and the SD2DSS is mapped to a fifth SC-FDMA symbol and a sixth SC-FDMA symbol in the second slot of the subframe.

9. The UE of claim 7, wherein when each of SC-FDMA symbols of the subframe includes an extended cyclic prefix, the PD2DSS is mapped to a first SC-FDMA symbol and a second SC-FDMA symbol in the first slot of the subframe, and the SD2DSS is mapped to a fourth SC-FDMA symbol and a fifth SC-FDMA symbol in the second slot of the subframe.

10. The UE of claim 7, wherein a last SC-FDMA symbol of the subframe is configured as a gap.

11. The UE of claim 8, wherein the DMRSs are mapped to a fourth SC-FDMA symbol of the first slot and a fourth SC-FDMA symbol of the second slot.

12. The UE of claim 9, wherein the DMRSs are mapped to a third SC-FDMA symbol of the first slot and a third SC-FDMA symbol of the second slot.

* * * * *